US010909508B2

(12) United States Patent
Fineman et al.

(10) Patent No.: US 10,909,508 B2
(45) Date of Patent: *Feb. 2, 2021

(54) SYSTEMS AND METHODS TO FACILITATE THE REDEMPTION OF OFFER BENEFITS IN A FORM OF THIRD PARTY STATEMENT CREDITS

(71) Applicant: Visa International Service Association, San Francisco, CA (US)

(72) Inventors: Daniel Eisen Fineman, San Francisco, CA (US); Christopher Magpayo, Belmont, CA (US); Vaishali Rao, San Francisco, CA (US); Derek Vroom, San Mateo, CA (US); Ann T. Wang Reed, Burlingame, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,697

(22) Filed: Oct. 29, 2019

(65) Prior Publication Data

US 2020/0065778 A1    Feb. 27, 2020

Related U.S. Application Data

(63) Continuation of application No. 14/538,121, filed on Nov. 11, 2014, now Pat. No. 10,489,754.

(Continued)

(51) Int. Cl.
*G06Q 20/02* (2012.01)
*G06Q 20/10* (2012.01)
(Continued)

(52) U.S. Cl.
CPC ............ *G06Q 20/02* (2013.01); *G06Q 20/10* (2013.01); *G06Q 20/24* (2013.01); *G06Q 20/40* (2013.01); *G06Q 30/0207* (2013.01)

(58) Field of Classification Search
CPC ..................................................... G06Q 20/02
See application file for complete search history.

(56) References Cited

U.S. PATENT DOCUMENTS 4,613,904 A   9/1986 Lurie
4,751,374 A   6/1988 Nose
(Continued)

FOREIGN PATENT DOCUMENTS

CA    2680531 A1    9/2008
JP    2000357204 A  12/2000
(Continued)

OTHER PUBLICATIONS

"Kimery Kathryn, Mccord Mary, "Third-Party Assurances: Mapping the road to trust in e-retailing", Journal of Information and Technology Theory and Application" (Year: 2002).*

(Continued)

*Primary Examiner* — Elizabeth H Rosen
*Assistant Examiner* — Kevin T Poe
(74) *Attorney, Agent, or Firm* — The Webb Law Firm

(57) ABSTRACT

A system and method configured to provide a mechanism allowing a third party, not involved in a payment transaction made between a merchant and a payment account, to provide a credit to the payment account as an offer benefit redeemed in view of the payment transaction. The mechanism includes a transaction handler of a payment processing network configured to provide transaction information relevant to the offer to the third party. If the third party determines that a qualifying transaction in the payment account is entitled to the benefit, the third party communicates a request, via an application programming interface (API), to a portal of the transaction handler for a credit to the payment account for the payment transaction; if the request is approved, in (Continued)

response, the transaction handler generates a credit transaction for the payment account.

20 Claims, 15 Drawing Sheets

Related U.S. Application Data

(60) Provisional application No. 61/902,493, filed on Nov. 11, 2013.

(51) Int. Cl.
  *G06Q 20/24* (2012.01)
  *G06Q 20/40* (2012.01)
  *G06Q 30/02* (2012.01)

(56) References Cited

U.S. PATENT DOCUMENTS

| | | |
|---|---|---|
| 4,941,090 A | 7/1990 | McCarthy |
| 5,025,372 A | 6/1991 | Burton et al. |
| 5,117,355 A | 5/1992 | McCarthy |
| 5,202,826 A | 4/1993 | McCarthy |
| 5,287,268 A | 2/1994 | McCarthy |
| 5,401,946 A | 3/1995 | Weinblatt |
| 5,471,669 A | 11/1995 | Lidman |
| 5,495,412 A | 2/1996 | Thiessen |
| 5,592,560 A | 1/1997 | Deaton et al. |
| 5,604,921 A | 2/1997 | Alanara |
| 5,621,812 A | 4/1997 | Deaton et al. |
| 5,638,457 A | 6/1997 | Deaton et al. |
| 5,684,990 A | 11/1997 | Boothby |
| 5,687,322 A | 11/1997 | Deaton et al. |
| 5,689,100 A | 11/1997 | Carrithers et al. |
| 5,710,886 A | 1/1998 | Christensen et al. |
| 5,734,838 A | 3/1998 | Robinson et al. |
| 5,745,036 A | 4/1998 | Clare |
| 5,774,870 A | 6/1998 | Storey |
| 5,855,008 A | 12/1998 | Goldhaber et al. |
| RE36,116 E | 2/1999 | McCarthy |
| 5,870,030 A | 2/1999 | DeLuca et al. |
| 5,923,016 A | 7/1999 | Fredregill et al. |
| 5,924,080 A | 7/1999 | Johnson |
| 5,937,391 A | 8/1999 | Ikeda et al. |
| 5,945,653 A | 8/1999 | Walker et al. |
| 5,956,694 A | 9/1999 | Powell |
| 5,974,396 A | 10/1999 | Anderson et al. |
| 6,009,411 A | 12/1999 | Kepecs |
| 6,014,635 A | 1/2000 | Harris et al. |
| 6,029,141 A | 2/2000 | Bezos et al. |
| 6,032,136 A | 2/2000 | Brake, Jr. et al. |
| 6,035,280 A | 3/2000 | Christensen |
| 6,061,660 A | 5/2000 | Eggleston et al. |
| 6,067,529 A | 5/2000 | Ray et al. |
| 6,070,147 A | 5/2000 | Harms et al. |
| 6,105,001 A | 8/2000 | Masi et al. |
| 6,119,101 A | 9/2000 | Peckover |
| 6,138,911 A | 10/2000 | Fredregill et al. |
| 6,216,129 B1 | 4/2001 | Eldering |
| 6,222,914 B1 | 4/2001 | McMullin |
| 6,243,687 B1 | 6/2001 | Powell |
| 6,251,017 B1 | 6/2001 | Leason et al. |
| 6,282,522 B1 | 8/2001 | Davis et al. |
| 6,285,983 B1 | 9/2001 | Jenkins |
| 6,292,786 B1 | 9/2001 | Deaton et al. |
| 6,298,330 B1 | 10/2001 | Gardenswartz et al. |
| 6,307,958 B1 | 10/2001 | Deaton et al. |
| 6,313,732 B1 | 11/2001 | DeLuca et al. |
| 6,318,631 B1 | 11/2001 | Halperin |
| 6,318,911 B1 | 11/2001 | Kitahara |
| 6,321,201 B1 | 11/2001 | Dahl |
| 6,332,126 B1 | 12/2001 | Peirce et al. |
| 6,334,108 B1 | 12/2001 | Deaton et al. |
| 6,334,110 B1 | 12/2001 | Walter et al. |
| 6,336,099 B1 | 1/2002 | Barnett et al. |
| 6,341,353 B1 | 1/2002 | Herman et al. |
| 6,377,935 B1 | 4/2002 | Deaton et al. |
| 6,405,174 B1 | 6/2002 | Walker et al. |
| 6,408,286 B1 | 6/2002 | Heiden |
| 6,450,407 B1 | 9/2002 | Freeman et al. |
| 6,505,046 B1 | 1/2003 | Baker |
| 6,505,168 B1 | 1/2003 | Rothman et al. |
| 6,519,571 B1 | 2/2003 | Guheen et al. |
| 6,594,640 B1 | 7/2003 | Postrel |
| 6,606,745 B2 | 8/2003 | Maggio |
| 6,647,257 B2 | 11/2003 | Owensby |
| 6,647,269 B2 | 11/2003 | Hendrey et al. |
| 6,663,105 B1 | 12/2003 | Sullivan et al. |
| 6,685,093 B2 | 2/2004 | Challa et al. |
| 6,694,300 B1 | 2/2004 | Walker et al. |
| 6,721,743 B1 | 4/2004 | Sakakibara |
| 6,736,322 B2 | 5/2004 | Gobburu et al. |
| 6,741,968 B2 | 5/2004 | Jacoves et al. |
| 6,748,365 B1 | 6/2004 | Quinlan et al. |
| 6,749,120 B2 | 6/2004 | Hung et al. |
| 6,775,539 B2 | 8/2004 | Deshpande |
| 6,820,061 B2 | 11/2004 | Postrel |
| 6,829,586 B2 | 12/2004 | Postrel |
| 6,842,739 B2 | 1/2005 | Postrel |
| 6,856,820 B1 | 2/2005 | Kolls |
| 6,856,992 B2 | 2/2005 | Britton et al. |
| 6,865,547 B1 | 3/2005 | Brake, Jr. et al. |
| 6,876,971 B1 | 4/2005 | Burke |
| 6,877,665 B2 | 4/2005 | Challa et al. |
| 6,901,406 B2 | 5/2005 | Nabe et al. |
| 6,912,398 B1 | 6/2005 | Domnitz |
| 6,922,686 B2 | 7/2005 | Okamoto et al. |
| 6,937,995 B1 | 8/2005 | Kepecs |
| 6,938,022 B1 | 8/2005 | Singhal |
| 6,941,376 B2 | 9/2005 | Mitchell et al. |
| 6,947,898 B2 | 9/2005 | Postrel |
| 6,965,868 B1 | 11/2005 | Bednarek |
| 6,978,250 B1 | 12/2005 | Kawan et al. |
| 6,996,560 B1 | 2/2006 | Choi et al. |
| 7,003,476 B1 | 2/2006 | Samra et al. |
| 7,013,286 B1 | 3/2006 | Aggarwal et al. |
| 7,024,374 B1 | 4/2006 | Day et al. |
| 7,024,409 B2 | 4/2006 | Iyengar |
| 7,028,906 B2 | 4/2006 | Challa et al. |
| 7,035,855 B1 | 4/2006 | Kilger et al. |
| 7,039,599 B2 | 5/2006 | Merriman et al. |
| 7,054,830 B1 | 5/2006 | Eggleston et al. |
| 7,062,510 B1 | 6/2006 | Eldering |
| 7,072,847 B2 | 7/2006 | Ulenas et al. |
| 7,072,864 B2 | 7/2006 | Brake, Jr. et al. |
| 7,096,190 B2 | 8/2006 | Postrel |
| 7,107,249 B2 | 9/2006 | Dively et al. |
| 7,120,590 B1 | 10/2006 | Eisen et al. |
| 7,134,087 B2 | 11/2006 | Bushold et al. |
| 7,158,943 B2 | 1/2007 | van der Riet |
| 7,158,955 B2 | 1/2007 | Diveley et al. |
| 7,163,145 B2 | 1/2007 | Cohagan et al. |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,194,422 B1 | 3/2007 | St. John Killick |
| 7,219,071 B2 | 5/2007 | Gallagher |
| 7,225,142 B1 | 5/2007 | Apte et al. |
| 7,257,545 B1 | 8/2007 | Hung |
| 7,260,837 B2 | 8/2007 | Abraham et al. |
| 7,263,507 B1 | 8/2007 | Brake, Jr. et al. |
| 7,264,152 B2 | 9/2007 | Tsuei et al. |
| 7,269,578 B2 | 9/2007 | Sweeney |
| 7,299,194 B1 | 11/2007 | Manganaris et al. |
| 7,308,254 B1 | 12/2007 | Rissanen |
| 7,318,049 B2 | 1/2008 | Iannacci |
| 7,328,169 B2 | 2/2008 | Temares et al. |
| 7,330,110 B1 | 2/2008 | Heintzman et al. |
| 7,337,127 B1 | 2/2008 | Smith et al. |
| 7,340,438 B2 | 3/2008 | Nordman et al. |
| 7,360,251 B2 | 4/2008 | Spalink et al. |
| 7,370,811 B2 | 5/2008 | Turner et al. |
| 7,373,311 B2 | 5/2008 | Lambert et al. |

(56) References Cited

U.S. PATENT DOCUMENTS

| | | |
|---|---|---|
| 7,376,580 B1 | 5/2008 | Walker et al. |
| 7,386,485 B1 * | 6/2008 | Mussman .............. G06Q 30/02 |
| | | 705/14.1 |
| 7,392,224 B1 | 6/2008 | Bauer et al. |
| 7,398,225 B2 | 7/2008 | Voltmer et al. |
| 7,424,439 B1 | 9/2008 | Fayyad et al. |
| 7,424,441 B2 | 9/2008 | George et al. |
| 7,424,617 B2 | 9/2008 | Boyd et al. |
| 7,428,498 B2 | 9/2008 | Voltmer et al. |
| 7,433,845 B1 | 10/2008 | Flitcroft et al. |
| 7,444,658 B1 | 10/2008 | Matz et al. |
| 7,461,022 B1 | 12/2008 | Churchill et al. |
| 7,464,859 B1 * | 12/2008 | Hawkins ................ G06Q 20/12 |
| | | 235/379 |
| 7,490,052 B2 | 2/2009 | Kilger et al. |
| 7,490,058 B2 | 2/2009 | Dan et al. |
| 7,493,655 B2 | 2/2009 | Brown |
| 7,526,485 B2 | 4/2009 | Hagan et al. |
| 7,533,038 B2 | 5/2009 | Blume et al. |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,435 B2 | 8/2009 | Suk |
| 7,606,730 B2 | 10/2009 | Antonucci |
| 7,613,628 B2 | 11/2009 | Ariff et al. |
| 7,624,041 B2 | 11/2009 | Postrel |
| 7,665,660 B2 | 2/2010 | Degliantoni et al. |
| 7,668,785 B1 | 2/2010 | Hammad |
| 7,680,688 B2 | 3/2010 | Hessburg et al. |
| 7,686,218 B2 | 3/2010 | Hessburg et al. |
| 7,729,977 B2 | 6/2010 | Xiao et al. |
| 7,742,943 B2 | 6/2010 | Postrel |
| 7,752,134 B2 | 7/2010 | Spear |
| 7,753,264 B2 | 7/2010 | Shafer et al. |
| 7,765,124 B2 | 7/2010 | Postrel |
| 7,769,630 B2 | 8/2010 | Postrel |
| 7,777,053 B2 | 8/2010 | Sanganbhatla et al. |
| 7,792,518 B2 | 9/2010 | Trioano et al. |
| 7,828,206 B2 | 11/2010 | Hessburg et al. |
| 7,844,490 B2 | 11/2010 | Patterson |
| 7,853,529 B1 | 12/2010 | Walker et al. |
| 7,868,218 B2 | 1/2011 | Clark et al. |
| 7,870,022 B2 | 1/2011 | Bous et al. |
| 7,894,634 B2 | 2/2011 | Chung |
| 7,933,800 B2 | 4/2011 | Main et al. |
| 7,937,291 B2 | 5/2011 | Carlson et al. |
| 7,970,705 B2 | 6/2011 | Patterson |
| 8,010,405 B1 | 8/2011 | Bortolin et al. |
| 8,019,685 B2 | 9/2011 | Patterson |
| 8,046,256 B2 | 10/2011 | Chien et al. |
| 8,099,318 B2 | 1/2012 | Moukas et al. |
| 8,103,545 B2 | 1/2012 | Ramer et al. |
| 8,103,588 B2 | 1/2012 | Patterson |
| 8,155,999 B2 | 4/2012 | de Boer et al. |
| 8,180,671 B2 | 5/2012 | Cohagan et al. |
| 8,229,819 B2 | 7/2012 | Ransom et al. |
| 8,265,993 B2 | 9/2012 | Chien et al. |
| 8,285,643 B2 | 10/2012 | Isaacson et al. |
| 8,290,858 B1 | 10/2012 | Ankarath |
| 8,301,593 B2 | 10/2012 | Hoffmann et al. |
| 8,302,030 B2 | 10/2012 | Soroca et al. |
| 8,311,845 B2 | 11/2012 | Vengroff et al. |
| 8,313,023 B1 | 11/2012 | McGhie et al. |
| 8,315,929 B2 | 11/2012 | Allen-Rouman et al. |
| 8,332,290 B1 | 12/2012 | Venturo et al. |
| 8,341,038 B1 | 12/2012 | Rolf et al. |
| 8,342,399 B1 | 1/2013 | McGhie et al. |
| 8,401,967 B1 | 3/2013 | Postrel |
| 8,478,640 B2 | 7/2013 | Postrel |
| 8,478,692 B2 | 7/2013 | Carlson et al. |
| 8,511,550 B1 | 8/2013 | McGhie et al. |
| 8,639,571 B1 | 1/2014 | Leason et al. |
| 8,751,295 B2 | 6/2014 | Tiku et al. |
| 8,781,893 B2 | 7/2014 | Walker et al. |
| 8,942,992 B1 | 1/2015 | Zhu |
| 2001/0027413 A1 | 10/2001 | Bhutta |
| 2001/0044751 A1 | 11/2001 | Pugliese, III et al. |
| 2001/0049620 A1 | 12/2001 | Blasko |
| 2002/0002533 A1 | 1/2002 | Singhal |
| 2002/0002597 A1 | 1/2002 | Morrell, Jr. |
| 2002/0004733 A1 | 1/2002 | Addante |
| 2002/0004754 A1 | 1/2002 | Gardenswartz et al. |
| 2002/0013765 A1 | 1/2002 | Shwartz |
| 2002/0042738 A1 | 4/2002 | Srinivasan et al. |
| 2002/0046116 A1 | 4/2002 | Hohle et al. |
| 2002/0046187 A1 | 4/2002 | Vargas et al. |
| 2002/0053076 A1 | 5/2002 | Landesmann |
| 2002/0053078 A1 | 5/2002 | Holtz et al. |
| 2002/0059100 A1 | 5/2002 | Shore |
| 2002/0060246 A1 | 5/2002 | Gobburu et al. |
| 2002/0065713 A1 | 5/2002 | Awada et al. |
| 2002/0065723 A1 | 5/2002 | Anderson et al. |
| 2002/0070278 A1 | 6/2002 | Hung et al. |
| 2002/0077871 A1 | 6/2002 | Udelhoven et al. |
| 2002/0077969 A1 | 6/2002 | Walker et al. |
| 2002/0082918 A1 | 6/2002 | Warwick |
| 2002/0091569 A1 | 7/2002 | Kitaura et al. |
| 2002/0095333 A1 | 7/2002 | Jokinen et al. |
| 2002/0095387 A1 | 7/2002 | Sosa et al. |
| 2002/0099607 A1 | 7/2002 | Sosa et al. |
| 2002/0099649 A1 | 7/2002 | Lee et al. |
| 2002/0102993 A1 | 8/2002 | Hendrey et al. |
| 2002/0103703 A1 | 8/2002 | Spetalnick |
| 2002/0111856 A1 | 8/2002 | Messer et al. |
| 2002/0120588 A1 | 8/2002 | Preist et al. |
| 2002/0123928 A1 | 9/2002 | Eldering et al. |
| 2002/0128916 A1 | 9/2002 | Beinecke, III |
| 2002/0138346 A1 | 9/2002 | Kodaka et al. |
| 2002/0138428 A1 | 9/2002 | Spear |
| 2002/0143626 A1 | 10/2002 | Voltmer et al. |
| 2002/0160761 A1 | 10/2002 | Wolfe |
| 2002/0174013 A1 | 11/2002 | Freeman et al. |
| 2003/0004808 A1 | 1/2003 | Elhaoussine et al. |
| 2003/0009393 A1 | 1/2003 | Norris |
| 2003/0028451 A1 | 2/2003 | Ananian |
| 2003/0033211 A1 | 2/2003 | Haines et al. |
| 2003/0040964 A1 | 2/2003 | Lacek |
| 2003/0046153 A1 | 3/2003 | Robibero |
| 2003/0047602 A1 | 3/2003 | Iida et al. |
| 2003/0058261 A1 | 3/2003 | Challa et al. |
| 2003/0088462 A1 | 5/2003 | Carrithers et al. |
| 2003/0093314 A1 | 5/2003 | Leung et al. |
| 2003/0130895 A1 | 7/2003 | Antonucci et al. |
| 2003/0149623 A1 | 8/2003 | Chen |
| 2003/0191832 A1 | 10/2003 | Satyavolu et al. |
| 2003/0212595 A1 | 11/2003 | Antonucci et al. |
| 2003/0216967 A1 | 11/2003 | Williams |
| 2003/0225618 A1 | 12/2003 | Hessburg et al. |
| 2003/0225630 A1 | 12/2003 | Kakuta |
| 2003/0230630 A1 | 12/2003 | Whipple et al. |
| 2003/0236704 A1 | 12/2003 | Antonucci |
| 2003/0236712 A1 | 12/2003 | Antonucci et al. |
| 2004/0019518 A1 | 1/2004 | Abraham et al. |
| 2004/0019522 A1 | 1/2004 | Bortolin et al. |
| 2004/0049423 A1 | 3/2004 | Kawashima et al. |
| 2004/0054575 A1 | 3/2004 | Marshall |
| 2004/0054581 A1 | 3/2004 | Redford et al. |
| 2004/0054591 A1 | 3/2004 | Spaeth et al. |
| 2004/0068435 A1 | 4/2004 | Braunzell |
| 2004/0083143 A1 | 4/2004 | Rodger |
| 2004/0083170 A1 | 4/2004 | Bam et al. |
| 2004/0093512 A1 | 5/2004 | Sample |
| 2004/0104760 A1 | 6/2004 | Ando |
| 2004/0117250 A1 | 6/2004 | Lubow et al. |
| 2004/0122735 A1 | 6/2004 | Meshkin |
| 2004/0133472 A1 | 7/2004 | Leason et al. |
| 2004/0133504 A1 | 7/2004 | Dalal |
| 2004/0138949 A1 | 7/2004 | Darnton et al. |
| 2004/0144839 A1 | 7/2004 | Warwick |
| 2004/0148224 A1 | 7/2004 | Gauthier et al. |
| 2004/0167815 A1 | 8/2004 | DeLaHunt |
| 2004/0186773 A1 | 9/2004 | George et al. |
| 2004/0193685 A1 | 9/2004 | Proehl |
| 2004/0203648 A1 | 10/2004 | Wong |

(56) References Cited

U.S. PATENT DOCUMENTS

| | | |
|---|---|---|
| 2004/0210481 A1 | 10/2004 | Quinlan et al. |
| 2004/0215543 A1 | 10/2004 | Betz et al. |
| 2004/0225509 A1 | 11/2004 | Andre |
| 2004/0225603 A1 | 11/2004 | Allen et al. |
| 2004/0238622 A1 | 12/2004 | Freiberg |
| 2004/0249710 A1 | 12/2004 | Smith et al. |
| 2004/0254848 A1 | 12/2004 | Golan et al. |
| 2004/0260608 A1 | 12/2004 | Lewis et al. |
| 2004/0267611 A1 | 12/2004 | Hoerenz |
| 2005/0004836 A1 | 1/2005 | Ruttenberg |
| 2005/0004839 A1 | 1/2005 | Bakker et al. |
| 2005/0010533 A1 | 1/2005 | Cooper |
| 2005/0021399 A1 | 1/2005 | Postrel |
| 2005/0021400 A1 | 1/2005 | Postrel |
| 2005/0021401 A1 | 1/2005 | Postrel |
| 2005/0055275 A1 | 3/2005 | Newman et al. |
| 2005/0060225 A1 | 3/2005 | Postrel |
| 2005/0071225 A1 | 3/2005 | Bortolin et al. |
| 2005/0071227 A1 | 3/2005 | Hammad et al. |
| 2005/0071235 A1 | 3/2005 | Nguyen et al. |
| 2005/0080727 A1 | 4/2005 | Postrel |
| 2005/0091152 A1 | 4/2005 | Suisa |
| 2005/0109833 A1 | 5/2005 | Page |
| 2005/0114213 A1 | 5/2005 | Smith et al. |
| 2005/0119938 A1 | 6/2005 | Smith et al. |
| 2005/0125342 A1 | 6/2005 | Schiff |
| 2005/0131761 A1 | 6/2005 | Trika et al. |
| 2005/0133590 A1 | 6/2005 | Rettenmyer et al. |
| 2005/0144074 A1 | 6/2005 | Fredregill et al. |
| 2005/0149394 A1 | 7/2005 | Postrel |
| 2005/0160002 A1 | 7/2005 | Roetter et al. |
| 2005/0177750 A1 | 8/2005 | Gasparini et al. |
| 2005/0203966 A1 | 9/2005 | Labrou et al. |
| 2005/0205666 A1 | 9/2005 | Ward et al. |
| 2005/0210387 A1 | 9/2005 | Alagappan et al. |
| 2005/0216334 A1 | 9/2005 | Mehrabani-Farsi |
| 2005/0216823 A1 | 9/2005 | Petersen et al. |
| 2005/0240472 A1 | 10/2005 | Postrel |
| 2005/0240474 A1 | 10/2005 | Li |
| 2005/0240478 A1 | 10/2005 | Lubow et al. |
| 2005/0242179 A1 | 11/2005 | Warwick |
| 2005/0267812 A1 | 12/2005 | Jensen et al. |
| 2005/0267842 A1 | 12/2005 | Weichert et al. |
| 2005/0289001 A1 | 12/2005 | Parnau |
| 2006/0000900 A1 | 1/2006 | Fernandes et al. |
| 2006/0002189 A1 | 1/2006 | Berkman |
| 2006/0004613 A1 | 1/2006 | Roller et al. |
| 2006/0010033 A1 | 1/2006 | Thomas |
| 2006/0020511 A1 | 1/2006 | Postrel |
| 2006/0053056 A1 | 3/2006 | Alspach-Goss et al. |
| 2006/0059040 A1 | 3/2006 | Eldred et al. |
| 2006/0080233 A1* | 4/2006 | Mendelovich ......... G06Q 30/02 705/39 |
| 2006/0085260 A1 | 4/2006 | Yamagishi |
| 2006/0085263 A1 | 4/2006 | Greer et al. |
| 2006/0111967 A1 | 5/2006 | Forbes |
| 2006/0122921 A1 | 6/2006 | Comerford et al. |
| 2006/0129456 A1 | 6/2006 | Walker et al. |
| 2006/0136299 A1 | 6/2006 | Ruhmkorf |
| 2006/0143071 A1 | 6/2006 | Hofmann |
| 2006/0143075 A1 | 6/2006 | Carr et al. |
| 2006/0161501 A1* | 7/2006 | Waserstein ........... G06Q 20/382 705/65 |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0184419 A1 | 8/2006 | Postrel |
| 2006/0190337 A1 | 8/2006 | Ayers, Jr. et al. |
| 2006/0195359 A1 | 8/2006 | Robinson et al. |
| 2006/0206376 A1 | 9/2006 | Gibbs et al. |
| 2006/0208065 A1 | 9/2006 | Mendelovich et al. |
| 2006/0212900 A1 | 9/2006 | Ismail et al. |
| 2006/0235746 A1 | 10/2006 | Hammond et al. |
| 2006/0253320 A1 | 11/2006 | Heywood |
| 2006/0253321 A1 | 11/2006 | Heywood |
| 2006/0259364 A1 | 11/2006 | Strock et al. |
| 2006/0277103 A1 | 12/2006 | Fujita et al. |
| 2006/0287943 A1 | 12/2006 | Postrel |
| 2006/0289631 A1 | 12/2006 | Stretch et al. |
| 2006/0293948 A1 | 12/2006 | Weinblatt |
| 2006/0293959 A1 | 12/2006 | Hogan |
| 2007/0001016 A1 | 1/2007 | Hunter, Jr. et al. |
| 2007/0005416 A1 | 1/2007 | Jackson et al. |
| 2007/0005427 A1 | 1/2007 | Walker et al. |
| 2007/0011044 A1 | 1/2007 | Hansen |
| 2007/0022007 A1 | 1/2007 | Lawe |
| 2007/0022048 A1 | 1/2007 | Kingsborough et al. |
| 2007/0038515 A1 | 2/2007 | Postrel |
| 2007/0038516 A1 | 2/2007 | Apple et al. |
| 2007/0043619 A1 | 2/2007 | Leason et al. |
| 2007/0043620 A1 | 2/2007 | Leason et al. |
| 2007/0045405 A1 | 3/2007 | Rothschild |
| 2007/0055597 A1 | 3/2007 | Patel et al. |
| 2007/0067267 A1 | 3/2007 | Ives |
| 2007/0067297 A1 | 3/2007 | Kublickis |
| 2007/0078719 A1 | 4/2007 | Schmitt et al. |
| 2007/0084917 A1 | 4/2007 | Fajkowski |
| 2007/0100691 A1 | 5/2007 | Patterson |
| 2007/0106556 A1 | 5/2007 | Edwards et al. |
| 2007/0112629 A1 | 5/2007 | Solomon et al. |
| 2007/0124201 A1 | 5/2007 | Hu et al. |
| 2007/0129955 A1 | 6/2007 | Dalmia et al. |
| 2007/0130011 A1 | 6/2007 | Postrel |
| 2007/0136131 A1 | 6/2007 | Mankoff |
| 2007/0143178 A1 | 6/2007 | Citrin et al. |
| 2007/0150352 A1 | 6/2007 | Kelly-Frank et al. |
| 2007/0156470 A1 | 7/2007 | Granucci et al. |
| 2007/0162377 A1 | 7/2007 | Williams |
| 2007/0174295 A1 | 7/2007 | Abraham et al. |
| 2007/0185821 A1 | 8/2007 | Wells et al. |
| 2007/0192121 A1 | 8/2007 | Routson |
| 2007/0192122 A1 | 8/2007 | Routson et al. |
| 2007/0192784 A1 | 8/2007 | Postrel |
| 2007/0198338 A1 | 8/2007 | Heywood |
| 2007/0203807 A1 | 8/2007 | DeAngelis |
| 2007/0208671 A1 | 9/2007 | Brown et al. |
| 2007/0214049 A1 | 9/2007 | Postrel |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226059 A1 | 9/2007 | Postrel |
| 2007/0226061 A1 | 9/2007 | Chen et al. |
| 2007/0239521 A1 | 10/2007 | Khadpe et al. |
| 2007/0239532 A1 | 10/2007 | Benson et al. |
| 2007/0241189 A1 | 10/2007 | Slavin et al. |
| 2007/0244741 A1 | 10/2007 | Blume et al. |
| 2007/0255653 A1 | 11/2007 | Tumminaro et al. |
| 2007/0260509 A1 | 11/2007 | Hines et al. |
| 2007/0260736 A1 | 11/2007 | Miller |
| 2007/0265920 A1 | 11/2007 | Bistriceanu et al. |
| 2007/0265921 A1 | 11/2007 | Rempe et al. |
| 2007/0265923 A1 | 11/2007 | Krassner et al. |
| 2007/0282681 A1 | 12/2007 | Shubert et al. |
| 2007/0288313 A1 | 12/2007 | Brodson et al. |
| 2008/0004884 A1 | 1/2008 | Flake et al. |
| 2008/0010154 A1 | 1/2008 | Tietzen et al. |
| 2008/0021784 A1 | 1/2008 | Hessburg et al. |
| 2008/0021785 A1 | 1/2008 | Hessburg et al. |
| 2008/0027810 A1 | 1/2008 | Lerner et al. |
| 2008/0040222 A1 | 2/2008 | Gee |
| 2008/0040229 A1 | 2/2008 | Gholston |
| 2008/0040270 A1 | 2/2008 | Buchheit et al. |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Forydce, III et al. |
| 2008/0065490 A1 | 3/2008 | Novick et al. |
| 2008/0071587 A1 | 3/2008 | Granucci et al. |
| 2008/0071640 A1 | 3/2008 | Nguyen |
| 2008/0071680 A1 | 3/2008 | Sheets |
| 2008/0077487 A1 | 3/2008 | Davis et al. |
| 2008/0077499 A1 | 3/2008 | Ariff et al. |
| 2008/0082393 A1 | 4/2008 | Ozzie et al. |
| 2008/0082418 A1 | 4/2008 | Fordyce et al. |

(56) References Cited

U.S. PATENT DOCUMENTS

| | | |
|---|---|---|
| 2008/0103887 A1 | 5/2008 | Oldham et al. |
| 2008/0103968 A1 | 5/2008 | Bies et al. |
| 2008/0114657 A1 | 5/2008 | Forzley |
| 2008/0120182 A1 | 5/2008 | Arnold et al. |
| 2008/0120218 A1 | 5/2008 | Reid et al. |
| 2008/0120221 A1 | 5/2008 | Toneguzzo |
| 2008/0133345 A1 | 6/2008 | Cordery et al. |
| 2008/0133350 A1 | 6/2008 | White et al. |
| 2008/0133351 A1 | 6/2008 | White et al. |
| 2008/0133366 A1 | 6/2008 | Evans et al. |
| 2008/0134228 A1 | 6/2008 | Dion et al. |
| 2008/0154654 A1 | 6/2008 | Niessen et al. |
| 2008/0154676 A1 | 6/2008 | Suk |
| 2008/0154703 A1 | 6/2008 | Flake et al. |
| 2008/0154704 A1 | 6/2008 | Flake et al. |
| 2008/0154722 A1 | 6/2008 | Galinos |
| 2008/0154727 A1 | 6/2008 | Carlson |
| 2008/0162258 A1 | 7/2008 | Kala et al. |
| 2008/0162269 A1 | 7/2008 | Gilbert |
| 2008/0163257 A1 | 7/2008 | Carlson et al. |
| 2008/0167000 A1 | 7/2008 | Wentker et al. |
| 2008/0167961 A1 | 7/2008 | Wentker et al. |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0177627 A1 | 7/2008 | Cefail |
| 2008/0183480 A1 | 7/2008 | Carlson et al. |
| 2008/0184117 A1 | 7/2008 | Alsbury et al. |
| 2008/0195465 A1 | 8/2008 | Redmond et al. |
| 2008/0195473 A1 | 8/2008 | Laramy et al. |
| 2008/0201224 A1 | 8/2008 | Owens et al. |
| 2008/0201226 A1 | 8/2008 | Carlson et al. |
| 2008/0201472 A1 | 8/2008 | Bistriceanu et al. |
| 2008/0215429 A1 | 9/2008 | Ramer et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0222038 A1 | 9/2008 | Eden et al. |
| 2008/0228563 A1 | 9/2008 | Zellner et al. |
| 2008/0228582 A1 | 9/2008 | Fordyce et al. |
| 2008/0228583 A1 | 9/2008 | MacDonald et al. |
| 2008/0235091 A1 | 9/2008 | Holliday |
| 2008/0235243 A1 | 9/2008 | Lee et al. |
| 2008/0242317 A1 | 10/2008 | Abhyanker |
| 2008/0248815 A1 | 10/2008 | Busch |
| 2008/0249861 A1 | 10/2008 | Carotta et al. |
| 2008/0262915 A1 | 10/2008 | Gojkovic et al. |
| 2008/0300973 A1 | 12/2008 | DeWitt et al. |
| 2008/0313011 A1 | 12/2008 | Rose et al. |
| 2008/0313034 A1 | 12/2008 | Wise |
| 2008/0318559 A1 | 12/2008 | Porco |
| 2008/0319843 A1 | 12/2008 | Moser et al. |
| 2008/0319847 A1 | 12/2008 | Shepard |
| 2008/0319889 A1 | 12/2008 | Hammad |
| 2008/0320512 A1 | 12/2008 | Knight |
| 2009/0006183 A1 | 1/2009 | Paintin et al. |
| 2009/0006203 A1 | 1/2009 | Fordyce, III et al. |
| 2009/0006363 A1 | 1/2009 | Canny et al. |
| 2009/0018895 A1 | 1/2009 | Weinblatt et al. |
| 2009/0018909 A1 | 1/2009 | Grecia |
| 2009/0030793 A1 | 1/2009 | Fordyce, III |
| 2009/0037325 A1 | 2/2009 | Sarelson et al. |
| 2009/0043593 A1 | 2/2009 | Herbrich et al. |
| 2009/0048916 A1 | 2/2009 | Nuzum et al. |
| 2009/0070207 A1 | 3/2009 | Engel et al. |
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0076911 A1 | 3/2009 | Vo et al. |
| 2009/0076912 A1 | 3/2009 | Rajan et al. |
| 2009/0076925 A1 | 3/2009 | DeWitt et al. |
| 2009/0081990 A1 | 3/2009 | Granucci et al. |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0132347 A1 | 5/2009 | Anderson et al. |
| 2009/0132365 A1 | 5/2009 | Gruenhagen et al. |
| 2009/0132366 A1 | 5/2009 | Lam et al. |
| 2009/0144201 A1 | 6/2009 | Gierkink et al. |
| 2009/0150211 A1 | 6/2009 | Bayne |
| 2009/0157511 A1 | 6/2009 | Spinnell et al. |
| 2009/0171747 A1 | 7/2009 | Lanning et al. |
| 2009/0171778 A1 | 7/2009 | Powell |
| 2009/0172551 A1 | 7/2009 | Kane et al. |
| 2009/0172728 A1 | 7/2009 | Shkedi et al. |
| 2009/0176580 A1 | 7/2009 | Herrmann et al. |
| 2009/0182634 A1 | 7/2009 | Park et al. |
| 2009/0192882 A1 | 7/2009 | Narahashi et al. |
| 2009/0198572 A1 | 8/2009 | Jurgens |
| 2009/0203387 A1 | 8/2009 | Wold et al. |
| 2009/0216579 A1 | 8/2009 | Zen et al. |
| 2009/0216616 A1 | 8/2009 | Wang et al. |
| 2009/0222323 A1 | 9/2009 | Kelly et al. |
| 2009/0222348 A1 | 9/2009 | Ransom et al. |
| 2009/0234708 A1 | 9/2009 | Heiser, II et al. |
| 2009/0234711 A1 | 9/2009 | Ramer et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0259560 A1 | 10/2009 | Bachenheimer |
| 2009/0271262 A1 | 10/2009 | Hammad |
| 2009/0271275 A1 | 10/2009 | Regmi et al. |
| 2009/0271305 A1 | 10/2009 | Lal et al. |
| 2009/0271327 A1 | 10/2009 | Lal et al. |
| 2009/0276304 A1 | 11/2009 | Dorr |
| 2009/0299941 A1 | 12/2009 | McColgan et al. |
| 2009/0307118 A1 | 12/2009 | Baumgartner, IV |
| 2009/0307130 A1 | 12/2009 | Tan |
| 2009/0313109 A1 | 12/2009 | Bous et al. |
| 2009/0327151 A1 | 12/2009 | Carlson et al. |
| 2010/0017275 A1 | 1/2010 | Carlson et al. |
| 2010/0030688 A1 | 2/2010 | Patterson |
| 2010/0042517 A1 | 2/2010 | Paintin et al. |
| 2010/0049588 A1 | 2/2010 | Debow |
| 2010/0049620 A1 | 2/2010 | Debow |
| 2010/0057549 A1 | 3/2010 | Boal |
| 2010/0057551 A1 | 3/2010 | Blaisdell |
| 2010/0057553 A1 | 3/2010 | Ameiss et al. |
| 2010/0075638 A1 | 3/2010 | Carlson et al. |
| 2010/0076820 A1 | 3/2010 | Davis |
| 2010/0082420 A1 | 4/2010 | Trifiletti et al. |
| 2010/0106568 A1 | 4/2010 | Grimes |
| 2010/0106569 A1 | 4/2010 | Grimes |
| 2010/0106570 A1 | 4/2010 | Radu et al. |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0125490 A1 | 5/2010 | Kiciman et al. |
| 2010/0125737 A1 | 5/2010 | Kang |
| 2010/0138838 A1 | 6/2010 | Lin et al. |
| 2010/0145786 A1 | 6/2010 | Fordyce, III et al. |
| 2010/0145855 A1 | 6/2010 | Fordyce, III et al. |
| 2010/0161404 A1 | 6/2010 | Taylor et al. |
| 2010/0169170 A1 | 7/2010 | Fordyce, III et al. |
| 2010/0174596 A1 | 7/2010 | Gilman et al. |
| 2010/0174623 A1 | 7/2010 | McPhie et al. |
| 2010/0211445 A1 | 8/2010 | Bodington |
| 2010/0211469 A1 | 8/2010 | Salmon et al. |
| 2010/0211694 A1 | 8/2010 | Razmov et al. |
| 2010/0274566 A1 | 10/2010 | Carlson |
| 2010/0274625 A1 | 10/2010 | Carlson |
| 2010/0274627 A1 | 10/2010 | Carlson |
| 2010/0274653 A1 | 10/2010 | Hammad |
| 2010/0274659 A1 | 10/2010 | Antonucci et al. |
| 2010/0280880 A1 | 11/2010 | Faith et al. |

(56) References Cited

U.S. PATENT DOCUMENTS

| | | |
|---|---|---|
| 2010/0280881 A1 | 11/2010 | Faith et al. |
| 2010/0280882 A1 | 11/2010 | Faith et al. |
| 2010/0280914 A1 | 11/2010 | Carlson |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2010/0325047 A1 | 12/2010 | Carlson et al. |
| 2010/0325048 A1 | 12/2010 | Carlson et al. |
| 2011/0004514 A1 | 1/2011 | Thomas |
| 2011/0022448 A1 | 1/2011 | Strock et al. |
| 2011/0022514 A1 | 1/2011 | Lal et al. |
| 2011/0029363 A1 | 2/2011 | Gillenson et al. |
| 2011/0047019 A1 | 2/2011 | Cervenka et al. |
| 2011/0054981 A1 | 3/2011 | Faith et al. |
| 2011/0066483 A1 | 3/2011 | Salmon et al. |
| 2011/0082739 A1 | 4/2011 | Pourfallah |
| 2011/0087530 A1 | 4/2011 | Fordyce, III et al. |
| 2011/0087531 A1 | 4/2011 | Winters et al. |
| 2011/0125509 A1 | 5/2011 | Lidstrom et al. |
| 2011/0125565 A1 | 5/2011 | MacIlwaine et al. |
| 2011/0145148 A1 | 6/2011 | Hammad |
| 2011/0161230 A1 | 6/2011 | Singh |
| 2011/0166922 A1 | 7/2011 | Fuerstenberg |
| 2011/0208575 A1 | 8/2011 | Bansal et al. |
| 2011/0218868 A1 | 9/2011 | Young et al. |
| 2011/0231235 A1 | 9/2011 | MacIlwaine et al. |
| 2011/0231258 A1 | 9/2011 | Winters |
| 2011/0238483 A1 | 9/2011 | Yoo et al. |
| 2011/0270665 A1 | 11/2011 | Kim et al. |
| 2011/0270719 A1 | 11/2011 | Hollars et al. |
| 2011/0276493 A1 | 11/2011 | Graham, III et al. |
| 2011/0276495 A1 | 11/2011 | Varadarajan et al. |
| 2011/0288906 A1 | 11/2011 | Thomas et al. |
| 2011/0288918 A1 | 11/2011 | Cervenka et al. |
| 2011/0288922 A1 | 11/2011 | Thomas et al. |
| 2011/0288924 A1 | 11/2011 | Thomas et al. |
| 2011/0288925 A1 | 11/2011 | Thomas et al. |
| 2011/0295670 A1 | 12/2011 | Thomas et al. |
| 2011/0295671 A1 | 12/2011 | Thomas et al. |
| 2011/0295675 A1 | 12/2011 | Reodica |
| 2011/0302011 A1 | 12/2011 | Yoder et al. |
| 2011/0307318 A1 | 12/2011 | LaPorte et al. |
| 2012/0010940 A1 | 1/2012 | Masi |
| 2012/0022981 A1* | 1/2012 | Morgenstern ......... G06Q 30/00 705/30 |
| 2012/0035998 A1 | 2/2012 | Chien et al. |
| 2012/0041812 A1 | 2/2012 | Postrel |
| 2012/0059702 A1 | 3/2012 | Yoder et al. |
| 2012/0066062 A1 | 3/2012 | Yoder et al. |
| 2012/0066064 A1 | 3/2012 | Yoder et al. |
| 2012/0072997 A1 | 3/2012 | Carlson et al. |
| 2012/0078697 A1 | 3/2012 | Carlson et al. |
| 2012/0078699 A1 | 3/2012 | Carlson et al. |
| 2012/0101881 A1 | 4/2012 | Taylor et al. |
| 2012/0101894 A1 | 4/2012 | Sterling et al. |
| 2012/0109730 A1 | 5/2012 | Yoder et al. |
| 2012/0123849 A1 | 5/2012 | Armstrong |
| 2012/0130859 A1 | 5/2012 | Wolfe et al. |
| 2012/0136704 A1 | 5/2012 | Carlson et al. |
| 2012/0150609 A1 | 6/2012 | Walker et al. |
| 2012/0179531 A1 | 7/2012 | Kim |
| 2012/0191525 A1 | 7/2012 | Singh et al. |
| 2012/0215610 A1 | 8/2012 | Amaro et al. |
| 2012/0215624 A1 | 8/2012 | Ramer et al. |
| 2012/0215637 A1 | 8/2012 | Hermann |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239477 A1 | 9/2012 | Cueli et al. |
| 2012/0239498 A1 | 9/2012 | Ramer et al. |
| 2012/0244948 A1 | 9/2012 | Dhillon et al. |
| 2012/0245987 A1 | 9/2012 | Isaacson et al. |
| 2012/0259695 A1 | 10/2012 | Glassman et al. |
| 2012/0259842 A1 | 10/2012 | Oman et al. |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0271703 A1* | 10/2012 | Postrel ............... G06Q 30/0233 705/14.28 |
| 2012/0271706 A1 | 10/2012 | Ransom et al. |
| 2012/0278173 A1 | 11/2012 | Vaidyanathan et al. |
| 2012/0290950 A1 | 11/2012 | Rapaport et al. |
| 2012/0303425 A1 | 11/2012 | Katzin et al. |
| 2012/0310838 A1 | 12/2012 | Harris et al. |
| 2012/0311617 A1 | 12/2012 | Walker et al. |
| 2012/0316945 A1 | 12/2012 | Wolf et al. |
| 2012/0323663 A1 | 12/2012 | Leach |
| 2012/0323664 A1 | 12/2012 | Klems |
| 2013/0006709 A1 | 1/2013 | Kosta |
| 2013/0006848 A1 | 1/2013 | Kuttuva |
| 2013/0046603 A1 | 2/2013 | Grigg et al. |
| 2013/0060679 A1 | 3/2013 | Oskolkov et al. |
| 2013/0091000 A1 | 4/2013 | Hagey et al. |
| 2013/0124287 A1 | 5/2013 | Bjorn et al. |
| 2013/0132205 A1 | 5/2013 | Harris |
| 2013/0132283 A1 | 5/2013 | Hayhow et al. |
| 2013/0151401 A1 | 6/2013 | Scipioni et al. |
| 2014/0129308 A1 | 5/2014 | Rappoport |

FOREIGN PATENT DOCUMENTS

| | | |
|---|---|---|
| JP | 2001501328 A | 1/2001 |
| JP | 2003502763 A | 1/2003 |
| JP | 2004303015 A | 10/2004 |
| JP | 2009501891 A | 1/2009 |
| KR | 20010083521 A | 9/2001 |
| KR | 20010096672 A | 11/2001 |
| KR | 20010096673 A | 11/2001 |
| KR | 20020004606 A | 1/2002 |
| KR | 20020009917 A | 2/2002 |
| KR | 20020050219 A | 6/2002 |
| KR | 20030008894 A | 1/2003 |
| KR | 20030080111 A | 10/2003 |
| KR | 1020040016771 A | 2/2004 |
| KR | 1020040028110 A | 4/2004 |
| KR | 1020040040253 A | 5/2004 |
| KR | 1020040045622 A | 6/2004 |
| KR | 1020040054657 A | 6/2004 |
| KR | 1020040077077 A | 9/2004 |
| KR | 1020040107715 A | 12/2004 |
| KR | 1020050061661 A | 6/2005 |
| KR | 1020050113156 A | 12/2005 |
| KR | 1020060101241 A | 9/2006 |
| KR | 1020070017559 A | 2/2007 |
| KR | 1020070030415 A | 3/2007 |
| KR | 100717590 B1 | 5/2007 |
| KR | 1020070110241 A | 11/2007 |
| KR | 1020080002731 A | 1/2008 |
| KR | 100836484 B1 | 6/2008 |
| KR | 1020080102439 A | 11/2008 |
| KR | 1020080104398 A | 12/2008 |
| WO | 9922328 A1 | 5/1999 |
| WO | 9950775 A1 | 10/1999 |
| WO | 0003328 A1 | 1/2000 |
| WO | 0031657 A2 | 6/2000 |
| WO | 0052620 A1 | 9/2000 |
| WO | 0060435 A2 | 10/2000 |
| WO | 0062231 A1 | 10/2000 |
| WO | 0079461 A1 | 12/2000 |
| WO | 0137183 A1 | 5/2001 |
| WO | 0139023 A2 | 5/2001 |
| WO | 0145008 A1 | 6/2001 |
| WO | 0157758 A1 | 8/2001 |
| WO | 0193161 A1 | 12/2001 |
| WO | 0205116 A2 | 1/2002 |

(56) References Cited

FOREIGN PATENT DOCUMENTS

| WO | 0214985 | A2 | 2/2002 |
|---|---|---|---|
| WO | 0219229 | A2 | 3/2002 |
| WO | 0242970 | A1 | 5/2002 |
| WO | 02071187 | A2 | 9/2002 |
| WO | 03025695 | A2 | 3/2003 |
| WO | 03081376 | A2 | 10/2003 |
| WO | 2005001631 | A2 | 1/2005 |
| WO | 2005072382 | A2 | 8/2005 |
| WO | 2005076181 | A1 | 8/2005 |
| WO | 2006028739 | A2 | 3/2006 |
| WO | 2006121541 | A1 | 11/2006 |
| WO | 2006126205 | A2 | 11/2006 |
| WO | 2007131258 | A1 | 11/2007 |
| WO | 2008013945 | A2 | 1/2008 |
| WO | 2008016923 | A2 | 2/2008 |
| WO | 2008023912 | A2 | 2/2008 |
| WO | 2008055217 | A2 | 5/2008 |
| WO | 2008064343 | A1 | 5/2008 |
| WO | 2008067543 | A2 | 6/2008 |
| WO | 2008102935 | A1 | 8/2008 |
| WO | 2008144643 | A1 | 11/2008 |
| WO | 2009144010 | A1 | 12/2009 |
| WO | 2010036915 | A2 | 4/2010 |
| WO | 2010093893 | A2 | 8/2010 |
| WO | 2010135642 | A2 | 11/2010 |
| WO | 2010141270 | A2 | 12/2010 |
| WO | 2012040270 | A2 | 3/2012 |
| WO | 2012061758 | A2 | 5/2012 |
| ZA | 200200475 | B | 6/2003 |

OTHER PUBLICATIONS

International Patent Application PCT/US2013/032307, International Search Report and Written Opinion, dated Jun. 26, 2013.
International Patent Application PCT/US2010/060576, International Search Report and Written Opinion, dated Jul. 28, 2011.
ISO8583—A layman's guide to understanding the ISO8583 Financial Transaction Message, Mar. 11, 2008; retrieved from http://www.lytsing.org/downloads/iso8583.pdf.
Kimery et al., "Third-Party Assurances: Mapping the road to trust in e-retailing", Journal of Information Technology Theory and Application, 2002.
Li, "Knowledge Gathering and Matching in Heterogeneous Databases," Working Notes of the AAAI Spring Symposium on Information Gathering, Mar. 27, 1995, pp. 116-1216.
Merchant Configured Advertised Incentives Funded Through Statement Credits, U.S. Appl. No. 13/053,113, filed Mar. 21, 2011, Inventor(s): John MacIlwaine et al, Status: Docketed New Case Ready for Examination, Status Date: Dec. 31, 2012.
Merchant Offer Program, U.S. Appl. No. 12/604,322, filed Oct. 22, 2009, Inventor(s): Edward Fordyce et al., Status: Non Final Action dated Jun. 4, 2014.
Mielikanen, "Privacy Problems with Anonymized Transaction Databases," 7th International Conference on Discovery Science, Oct. 2, 2004, pp. 219-229.
Punj et al., "Cluster Analysis in Marketing Research: Review and Suggestions for Application," Journal of Marketing Research, May 1983, pp. 134-148, vol. 20.
Real-time Statement Credits and Notifications, U.S. Appl. No. 12/566,350, filed Sep. 24, 2009, Inventor(s): Mark Carlson et al, Status: Docketed New Case—Ready for Examination, Status Date: Oct. 29, 2012.
Saranow et al., "Proclamation Points Reward!: For Spending Cash at Dealership or Using Automaker's Credit Card Accumulate Points and Use Toward Services or Vehicle Purchase," Chicago Sun-Times, Jun. 4, 2006, p. A60.
Systems and Methods to Provide Discount at Point of Sales Terminals, U.S. Appl. No. 13/648,849, filed Oct. 10, 2012, Inventor(s): Ryan Hagey et al., Status: Docketed New Case—Ready for Examination, Status Date: Nov. 21, 2012.
Systems and Methods to Provide Discount at Point of Sales Terminals, U.S. Appl. No. 13/676,535, filed Nov. 14, 2012 Inventor(s): Joseph Bjorn et al, Status: Docketed New Case—Ready for Examination, Status Date: Jan. 27, 2013.
Systems and Methods to Provide Offer Benefits Based on Issuer Identity, U.S. Appl. No. 14/072,561, filed Nov. 5, 2013, Inventor(s): Douglas Rappoport, Status: Docketed New Case—Ready for Examination, Status Date: Dec. 5, 2013.
Transaction Evaluation for Providing Rewards, U.S. Appl. No. 11/835,100, filed Aug. 7, 2007, Inventor(s): Edward Fordyce, Status: Non Final Action dated Aug. 20, 2014.
Van Grove, "Are Your Online Video Ads Driving Actual Offline Purchases?", available at http://mashable.com/2009/05/18/video-impact/#, May 18, 2009.
Wal-Mart, Target form mobile-pay network, Townsend, Matt, Bloomberg News, published Aug. 15, 2012 in the Raleigh, NC News & Observer and downloaded Sep. 26, 2012 from http://www.newsobserver.com/2012/08/15/2272412/wal-marttarget-form-mobile-pay.html.
Affiliate marketing, Wikipedia the free encyclopedia, available at http://en.wikipedia.org/wiki/Affiliate_programs.
Cashmore, "YouTube Ads: YouHate Em," available at http://mashable.com/2009/04/05/youtube-ads-youhate-em/#, Apr. 5, 2009.
Credit Card Finder: "Airline Miles Reward Credit Cards"; http://www.plasticrewards.com/airline-miles-reward/, 2009, 2 pages.
Credit Card Finder: "Cash Back Reward Credit Cards"; http://www.plasticrewards.com/creditcard/cash-back-reward/, 2009, 3 pages.
Credit Card Finder: "Compare Cash Back Credit Cards and Credit Card Offers"; http://www.plasticrewards.com/, 2009, 1 page.
Credit Card Finder: "Gas Reward Credit Cards"; http://www.plasticrewards.com/creditcard/gas-reward/, 2009, 3 pages.
Credit Card Finder: "Hotel Reward Credit Cards"; http://www.plasticrewards.com/credit-card/hotel-reward/, 2009, 2 pages.
Credit Card Finder: "Reward Credit Cards"; http://www.plasticrewards.com/credit-card/reward/, 2009, 3 pages.
Credit Card Finder: "Travel Reward Credit Cards"; http://www.plasticrewards.com/credit-card/travel-reward, 2009, 3 pages.
CreditCardGuide.com: "Car rebate credit cards"; http://www.creditcardguide.com/car-rebate.html/, 2009, 2 pages.
CreditCardGuide.com: "Cash Back Credit Cards"; http://www.creditcardguide.com/cashback2.html/, 2009, 2 pages.
CreditCardGuide.com: "Dining and entertainment credit cards"; http://www.creditcardguide.com/dining-entertainment.html/, 2009, 3 pages.
CreditCardGuide.com: "Financial reward credit cards"; http://www.creditcardguide.com/financial-reward-credit-cards.html/, 2009, 2 pages.
CreditCardGuide.com: "Foundation and charity credit cards"; http://www.creditcardguide.com/foundations-charities.html/, 2009, 3 pages.
CreditCardGuide.com: "Gas Rebate Credit Cards"; http://www.creditcardguide.com/gascards.html/, 2009, 2 pages.
CreditCardGuide.com: "Sports and outdoor enthusiast credit cards"; http://www.creditcardguide.com/sports-outdoors.html/, 2009, 2 pages.
CreditCardGuide.com: "Use Cash Back Credit Cards"; http://www.creditcardguide.com/cashback.html/, 2009, 3 pages.
CreditCardGuide.com: "Use home improvement reward credit cards"; http://www.creditcardguide.com/home-improvement-credit-cards.html/, 2009, 2 pages.
CreditCardGuide.com: "Use hotel reward credit cards and travel reward credit cards"; http://www.creditcardguide.com/hotel-reward-credit-cards.html/, 2009, 2 pages.
CreditCardGuide.com: "Use retail reward credit cards and brand name reward credit cards"; http//www.creditcardguide.com/retail-brand-credit-cards.html/, 2009, 2 pages.
CreditCardGuide.com: "Use Reward Credit Cards"; http://www.creditcardguide.com/reward-point-credit-cards.html/, 2009, 3 pages.
CreditCardGuide.com: "With Airline Credit Cards, Frequent Flyer credit cards, and Travel Reward Credit Cards"; http://www.creditcardguide.com/airline-frequent-flyer-cards.html/, 2009, 4 pages.
Expiring Virtual Gift Card Statement Credit Exchange for Loyalty Reward, U.S. Appl. No. 13/098,371, filed Apr. 29, 2011, Inventor(s): Nancy Kim et al, Status: Non Final Action dated Oct. 1, 2014.
International Patent Application PCT/US2010/024057, International Search Report & Written Opinion, dated Sep. 28, 2010.

(56) References Cited

OTHER PUBLICATIONS

International Patent Application PCT/US2011/029401, International Search Report and Written Opinion, dated Dec. 20, 2011.
International Patent Application PCT/US2011/039051, International Search Report and Written Opinion, dated Feb. 17, 2012.
International Patent Application PCT/US2011/046702, International Search Report and Written Opinion, dated Feb. 28, 2012.
International Patent Application PCT/US07/77039, International Preliminary Report on Patentability, dated Dec. 25, 2008.
International Patent Application PCT/US07/77039, International Search Report and Written Opinion, dated Aug. 25, 2008.
International Patent Application PCT/US07/77285, International Preliminary Report on Patentability, dated Apr. 2, 2009.
International Patent Application PCT/US07/77285, International Search Report and Written Opinion, dated Feb. 26, 2008.
International Patent Application PCT/US07/77440, International Search Report and Written Opinion, dated Feb. 11, 2008.
International Patent Application PCT/US07/77447, International Search Report and Written Opinion, dated Jun. 25, 2008.
International Patent Application PCT/US08/57128, International Search Report and Written Opinion, dated Jul. 17, 2008.
International Patent Application PCT/US08/61890, International Search Report and Written Opinion, dated Sep. 22, 2008.
International Patent Application PCT/US12/59607, International Preliminary Report on Patentability, dated Apr. 15, 2014.
International Patent Application PCT/US2009/052766, International Search Report and Written Opinion, dated Mar. 11, 2010.
International Patent Application PCT/US2009/058412, International Search Report and Written Opinion, dated May 11, 2010.
International Patent Application PCT/US2011/052465, International Search Report and Written Opinion, dated Mar. 2, 2012.
International Patent Application PCT/US2010/035769, International Search Report and Written Opinion, dated Jan. 12, 2011.
International Patent Application PCT/US2010/036076, International Search Report & Written Opinion, dated Dec. 30, 2010.
International Patent Application PCT/US2010/037646, International Search Report and Written Opinion, dated Jan. 18, 2011.
International Patent Application PCT/US2010/046360, International Search Report and Written Opinion, dated Mar. 30, 2011.
International Patent Application PCT/US2011/059410 International Search Report and Written Opinion, dated Apr. 11, 2013.
International Patent Application PCT/US2012/029273, International Search Report and Written Opinion, dated Oct. 29, 2012.
International Patent Application PCT/US2012/059607, International Search Report and Written Opinion, dated Mar. 15, 2013.
International Patent Application PCT/US2012/068541, International Search Report and Written Opinion, dated Mar. 20, 2013.
International Patent Application PCT/US2013/022572 International Search Report and Written Opinion, dated Apr. 22, 2013.
International Patent Application PCT/US2013/023642 International Search Report and Written Opinion, dated May 30, 2013.
International Patent Application PCT/US2013/024421 International Search Report and Written Opinion, dated May 8, 2013.

* cited by examiner

SYSTEMS AND METHODS TO FACILITATE THE REDEMPTION OF OFFER BENEFITS IN A FORM OF THIRD PARTY STATEMENT CREDITS

RELATED APPLICATIONS

The present application is a continuation of U.S. patent application Ser. No. 14/538,121, filed Nov. 11, 2014, and entitled "Systems and Methods to Facilitate the Redemption of Offer Benefits in a Form of Third Party Statement Credits," which claims the benefit of the filing date of Prov. U.S. Pat. App. Ser. No. 61/902,493, filed Nov. 11, 2013, and entitled "Systems and Methods to Facilitate the Redemption of Offer Benefits in a Form of Third Party Statement Credits", the entire disclosures of which are hereby incorporated herein by reference.

The present application relates to U.S. Pat. App. Pub. No. 2013/0124417, entitled "Systems and Methods to Provide Generalized Notifications," and U.S. Pat. App. Pub. No. 2011/0125565, entitled "Systems and Methods for Multi-Channel Offer Redemption," the entire disclosures of which applications are hereby incorporated herein by reference.

FIELD OF THE TECHNOLOGY

At least some embodiments of the present disclosure relate to the processing of payment transactions, such as payments made via credit cards, debit cards, prepaid cards, etc., and the redemption of the benefits of offers, such as coupons, deals, discounts, rewards, etc.

BACKGROUND

Millions of transactions occur daily through the use of payment cards, such as credit cards, debit cards, prepaid cards, etc. Payment processing systems, involving acquirer systems, issuer systems, transaction handlers to interconnect the acquirer systems and issuer systems, etc., have been developed to facilitate secure and efficient communications among parties involved in the payment transactions.

For example, U.S. Pat. App. Pub. No. 2009/0271262, published Oct. 28, 2009, discloses a first authorization request generated to include split payment data. After the first authorization request message is analyzed using a server computer, a second authorization request message is sent to a first service provider, and a third authorization request message is sent to a second service provider, to facilitate the split payment according to the split payment data.

Offers, such as coupons, deals, discounts, rewards, etc., typically involve benefits that are provided to the recipients of the offers after the redemption requirements of the respective offers are satisfied. A typical requirement involves the purchase of a product or service relevant to the corresponding offer.

Processing payments and offers using substantially separate systems have drawbacks, such as inefficient use of computation resources for security measures and processing, duplicative allocation of computation resources for the separate systems, time delay from the time when redemption requirements of offers are satisfied and the completion of the provisioning of the benefits of the offers, etc.

Some systems have been developed to at least partially integrate the payment processing and the offer processing. For example, U.S. Pat. App. Pub. No. 2011/0125565, published May 26, 2011, discloses a system to associate an offer with an account of a user in a data warehouse, in which a transaction handler is configured to identify a payment transaction in the account for a purchase eligible for the redemption of the offer. If the payment transaction is identified, the transaction handler provides the benefit of the offer to the account of the user via statement credits. For example, U.S. Pat. App. Pub. No. 2009/0112721, published Oct. 28, 2009, discloses a Value-Added Service Engine programmed to determine a benefit associated with a product after receiving transaction information identifying the product and after communicating with a supplier of the product.

U.S. Pat. App. Pub. No. 2010/0312626, published Dec. 9, 2010, discloses a transaction handler configured to receive an authorization request for a discount associated with an electronic coupon for a purchase. The electronic coupon has been received by the merchant to give the discount on a purchase by a consumer. The discount is to be debited from the sponsor account and credited to an account of the merchant.

U.S. Pat. App. Pub. No. 2011/0047019, published Feb. 24, 2011, discloses a transaction handler configured to forward a coupon authorization request message, identifying a sponsor account and a coupon, from a merchant's acquirer to a sponsor account's issuer, and when the coupon is eligible, to forward the corresponding authorization response from the issuer to the acquirer.

U.S. Pat. App. Pub. No. 2008/0133351, published Jun. 5, 2008, discloses a "Method and Apparatus for Reward Messaging, Discounting and Redemption at the Point of Interaction," in which, upon determining that the transaction is eligible for a discount, the authorization request message is updated to indicate that it is a discount transaction, and this updated authorization request message is then forwarded to the issuer (or issuer processor) for authorization. When a promo code is used by the POS terminal or merchant system to apply or calculate a discount amount at the point of interaction, the full transaction price may be authorized by the issuer, and full transaction price less the discount amount is then cleared and settled between the acquirer and the issuer after the transaction. When a promo code is not used, the authorization system forwards an authorization request message to the issuer for the purchase amount less the discount.

U.S. Pat. App. Pub. No. 2007/0011044, published Jan. 11, 2007, discloses a host system configured to transmit an authorization request to a credit provider. After discounts available for application to the transaction are identified with the host system and from the identifier of a credit instrument, a modified transaction having a total transaction cost reduced by application of at least one of the separate discounts is coordinated between the host system and the merchant.

U.S. patent application Ser. No. 12/036,018, filed Feb. 22, 2008, assigned Pub. No. 2009/0216579, and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as a cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. No. 7,937,286, issued on May 3, 2011 and entitled "System and Method for Analyzing Marketing Efforts," discloses a system that evaluates the cause and effect of advertising and marketing programs using card transaction data.

U.S. Pat. No. 7,665,660, issued on Feb. 23, 2010 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

The present application includes systems and methods configured to further improve the overall system performances, including interoperability, transaction integrity, efficiency in processing payments in combination with offers, time delay in processing, resource allocation, etc., and/or to provide enhanced services.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
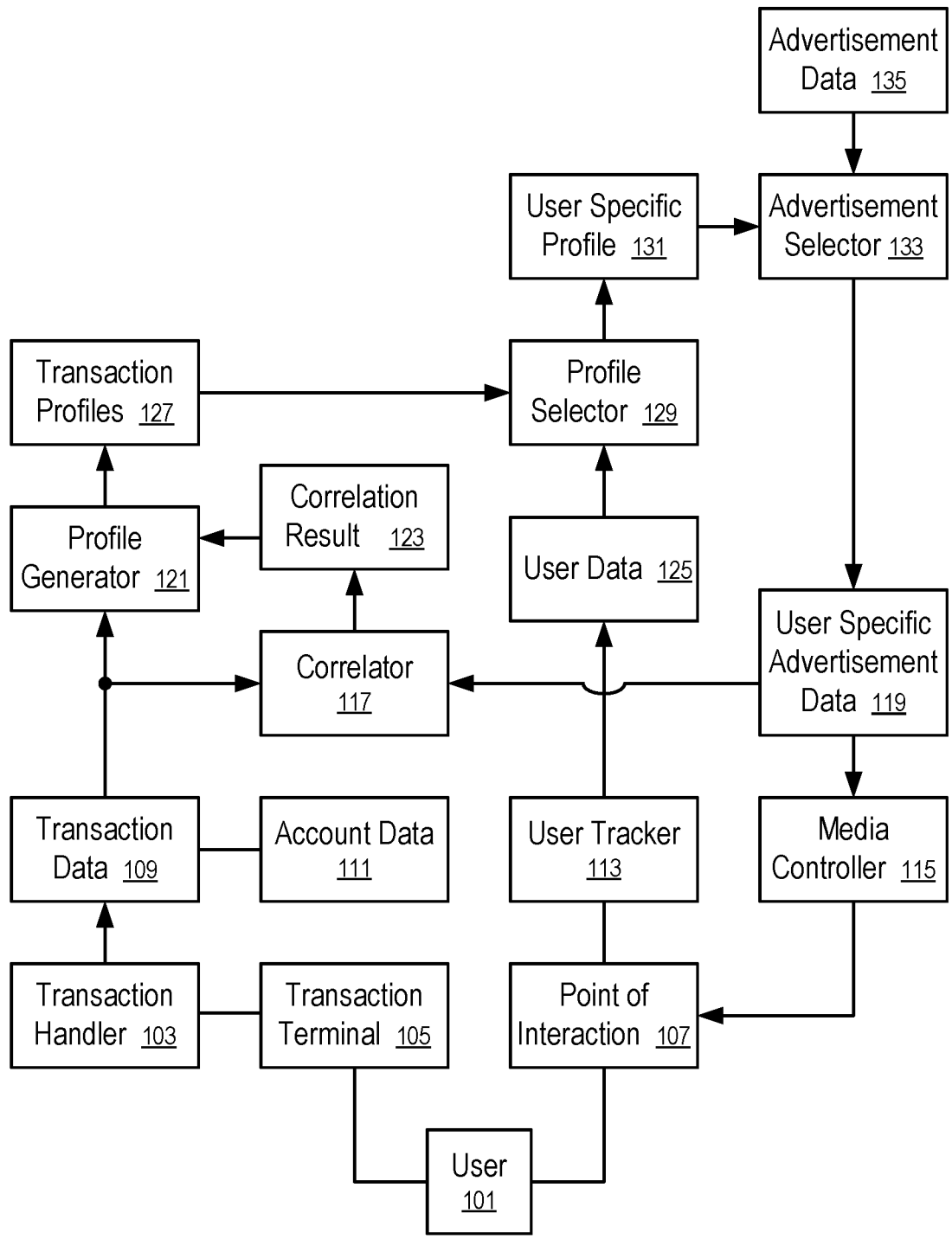
FIG. 1 illustrates a system to provide services based on transaction data according to one embodiment.

To facilitate automated offer redemption, data associating offers with account information identifying the consumer accounts or payment accounts of the users can be stored in a data warehouse coupled with a transaction handler of a payment processing network. For example, in one embodiment of associating offers with consumer/payment accounts, a portal of the transaction handler is configured to store data representing offers, and to associate user selected offers with the financial accounts of the respective users, if the users select advertisements containing the offers. When the financial accounts are used to make payments processed by the transaction handler for purchases that satisfy the respective redemption conditions of the offers, the transaction handler and/or the portal are configured to detect such payment transactions and fulfill the offers in an automated way.

For example, the advertisement providing the offer can be configured to have multiple selectable regions when the advertisement is presented in a web browser of a user. Examples of offers include discounts, incentives, rebates, coupons, rewards, cash back, etc. One of the selectable-regions contains a Uniform Resource Locator (URL) of the advertiser or merchant, which, when selected, directs the user to the website of the advertiser or merchant. A separate one of the selectable regions contains a Uniform Resource Locator (URL) of the portal of the transaction handler, which, when selected, directs the user to the portal for access to a user interface to register the offer with a financial account of the user. Examples of financial accounts of users include credit card accounts, debit card accounts, prepaid card accounts, bank accounts, etc. Some details and examples about associating offers with financial accounts are provided in U.S. Pat. App. Pub. No. 2011/0125565, entitled "Systems and Methods for Multi-Channel Offer Redemption."

After the offer is associated with the financial account of the user, the transaction handler and/or the portal are configured to detect that the user is making a payment using the financial account for a purchase that satisfies the redemption requirements of the offer. In response to the detection, the portal may optionally notify the user of the eligibility of the redemption of the offer using a communication reference associated with the financial account, and the transaction handler and/or the portal are configured to automate the processing of the offer for redemption, such as using the split-payment embodiment identified above, or via statement credits to the financial account of the user, or via benefits afforded via a loyalty program, such as reward points, loyalty points, etc. Some details and examples about offer fulfillment operations are provided in U.S. Pat. App. Pub.

No. 2011/0125565, entitled "Systems and Methods for Multi-Channel Offer Redemption."

Since the transaction handler records the transaction data for transactions made in various purchase channels, such as online marketplaces, offline in retail stores, phone orders, etc., the registered offer can be redeemed in an automated way, without being limited by the channel used to make the purchase and limited by the context of the purchase. Thus, the system provides a normalized, real-time, online and offline, redemption service for offers in combination with, and integrated with, the processing of payment transactions.

In one embodiment, trigger records are generated for the transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

In one embodiment, transaction information about transactions between enrolled merchants and enrolled account holders is provided to a merchant aggregator, which enrolls the merchants and account holders for enhanced communications with merchants and account holders. The transaction information is provided in real-time or concurrently with the processing of the respective transaction requests at the transaction handler. Details and examples in one embodiment regarding the communication via the merchant aggregator are provided in the section entitled "MERCHANT AGGREGATOR."

In one embodiment, generalized notifications are provided to intermediate service providers, which may use the generalized notifications to provide services, such as customized notifications, security alerts, offers, benefit redemptions, etc. Thus, the computing apparatus can be configured to use the same generic notification service to provide the relevant information in a generic way to various intermediate service providers, which can better customize their services to meet the needs of their customers. Details and examples in one embodiment regarding the generic notifications are provided in the section entitled "GENERALIZED NOTIFICATION."

In one embodiment, a mechanism is provided to allow a third party, not involved in a payment transaction made in a payment account of a user for a purchase from a merchant, to provide a credit to the payment account as an offer benefit redeemed in view of the payment transaction. Details and examples in one embodiment regarding such a mechanism are provided in the section entitled "THIRD PARTY STATEMENT CREDITS."

The transaction data, such as records of transactions made via credit accounts, debit accounts, prepaid accounts, bank accounts, stored value accounts and the like, can be further processed to optionally provide information for various services, such as reporting, benchmarking, advertising, content or offer selection, customization, personalization, prioritization, etc. In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities.

Transaction Data Based Services

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 1, the system further includes a correlator (117) to correlate user specific advertisement data (119) with transactions resulting from the user specific advertisement data (119). The correlation results (123) can be used by the profile generator (121) to improve the transaction profiles (127).

Figure 2:
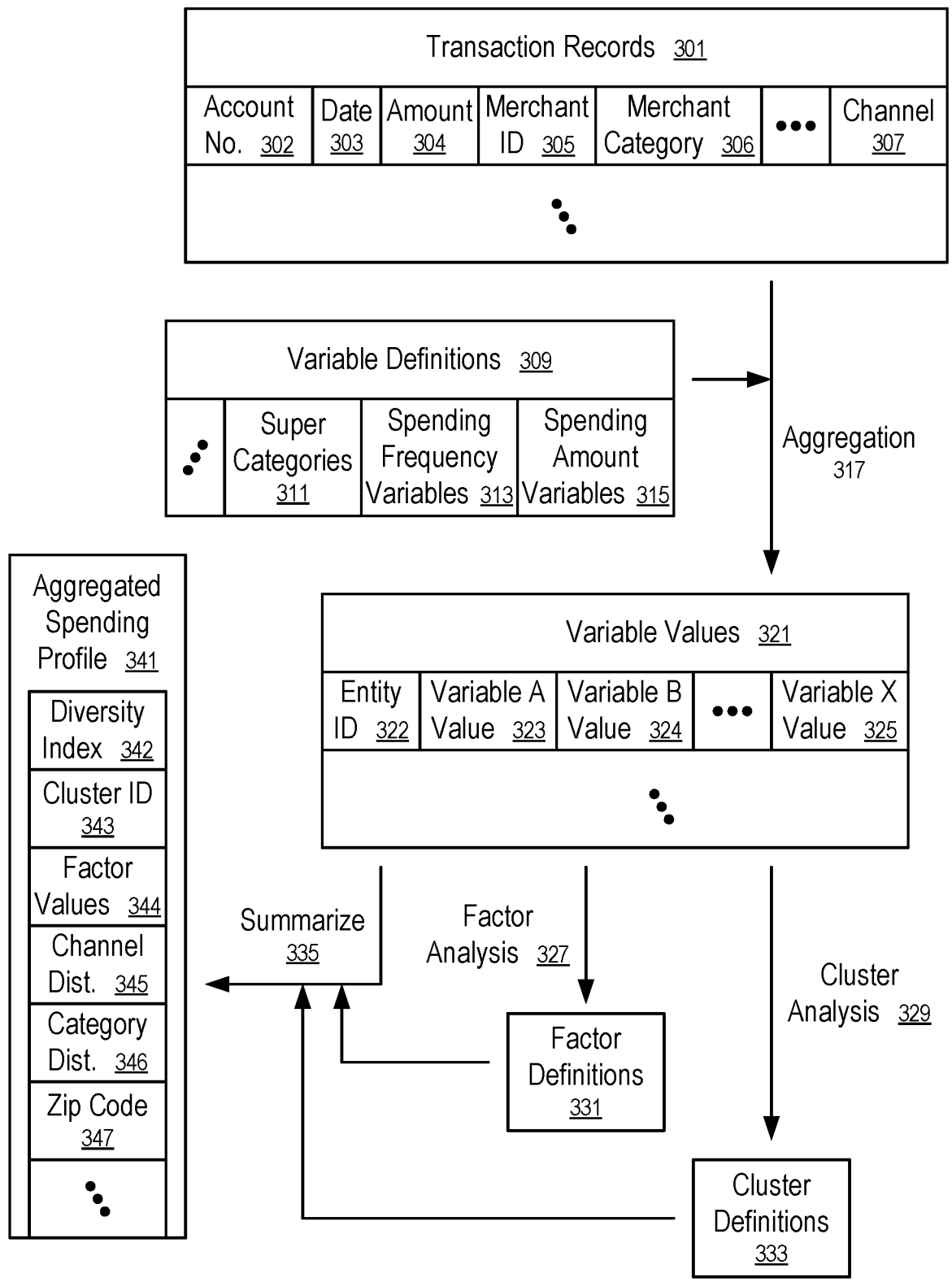
FIG. 2 illustrates the generation of an aggregated spending profile according to one embodiment.
Figure 3:
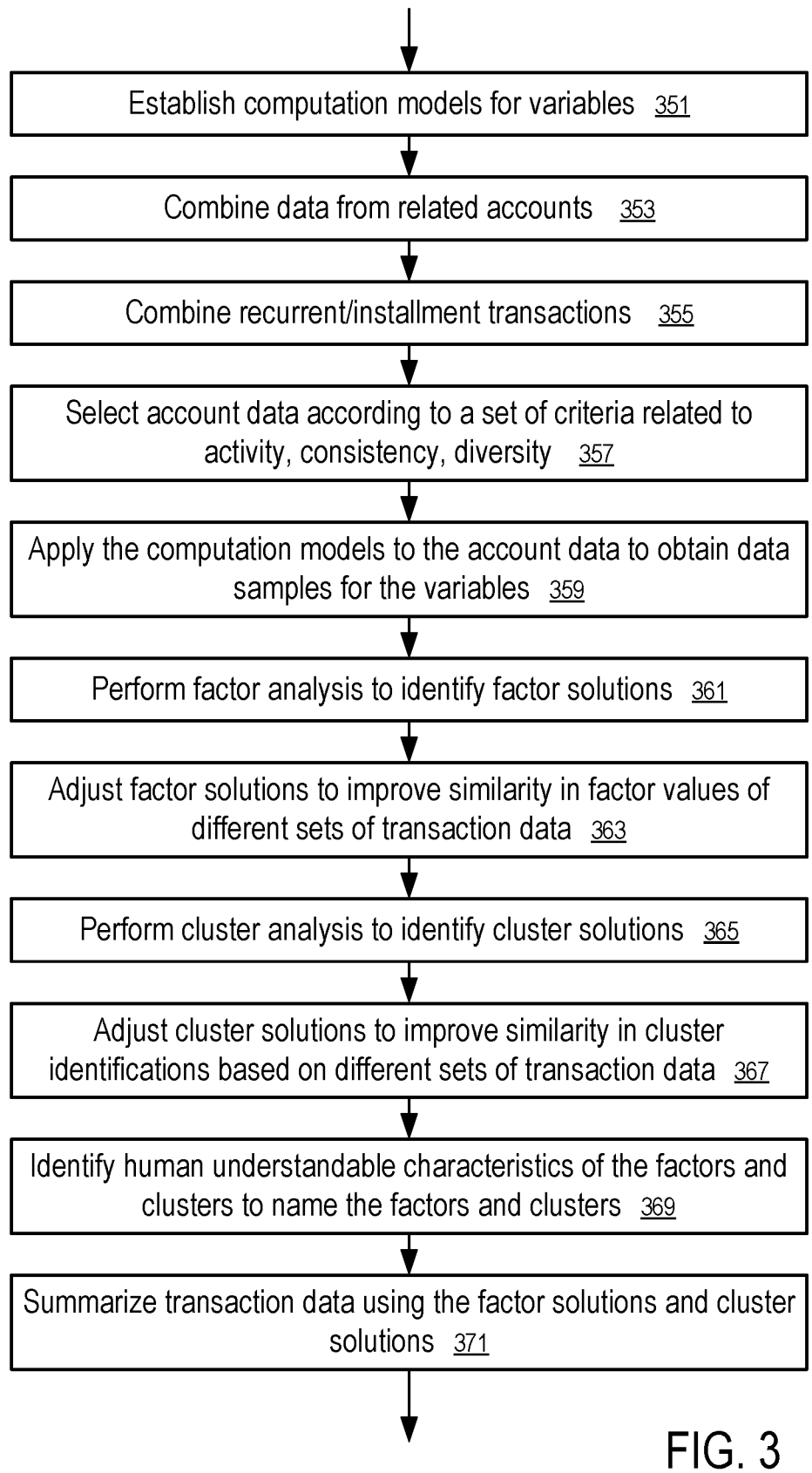
FIG. 3 shows a method to generate an aggregated spending profile according to one embodiment.

The transaction profiles (127) of one embodiment are generated from the transaction data (109) in a way as illustrated in FIGS. 2 and 3. For example, in FIG. 2, an aggregated spending profile (341) is generated via the factor analysis (327) and cluster analysis (329) to summarize (335) the spending patterns/behaviors reflected in the transaction records (301).

Figure 4:
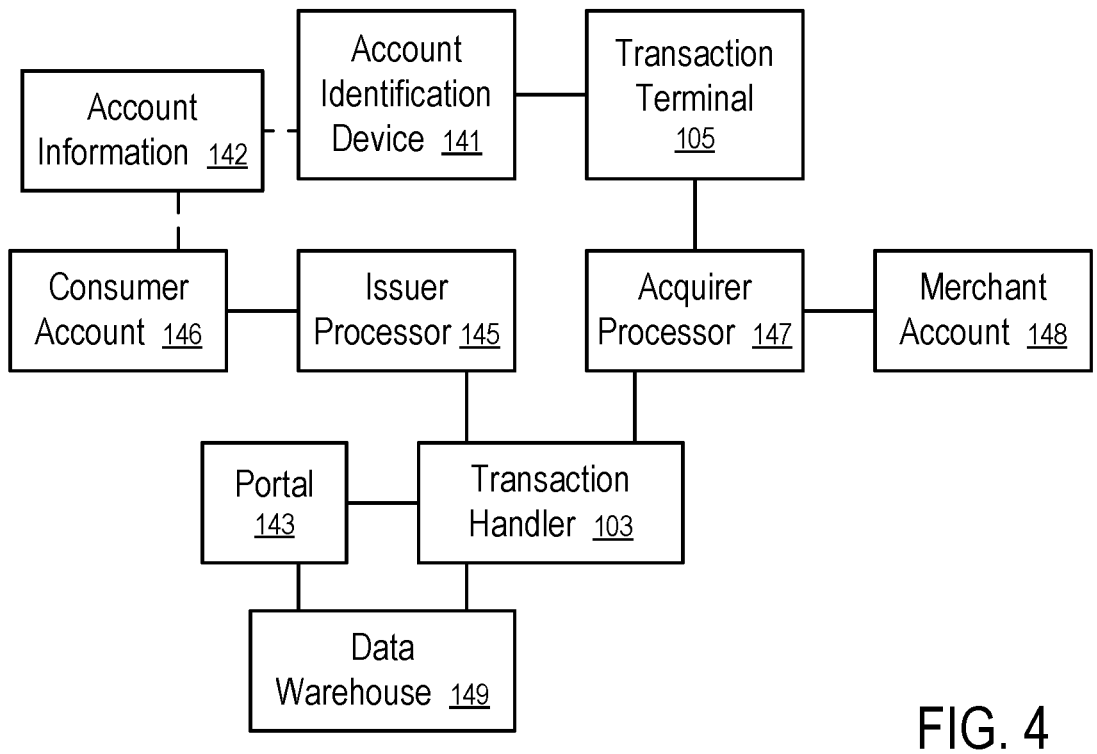
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
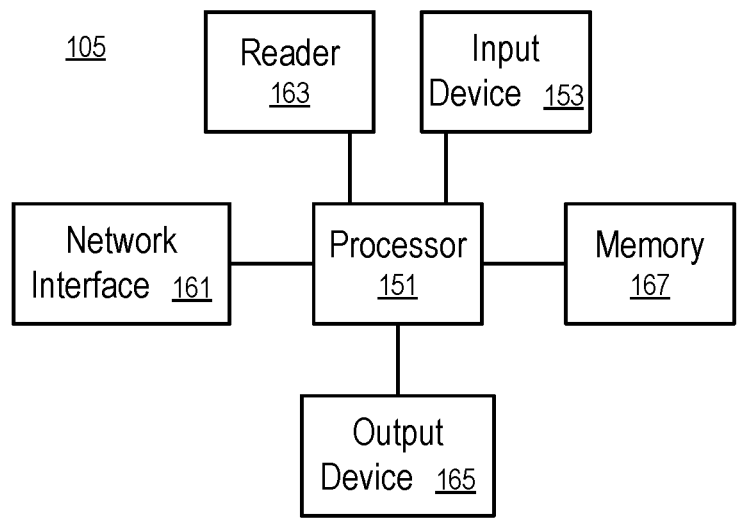
FIG. 5 illustrates a transaction terminal according to one embodiment.
Figure 6:
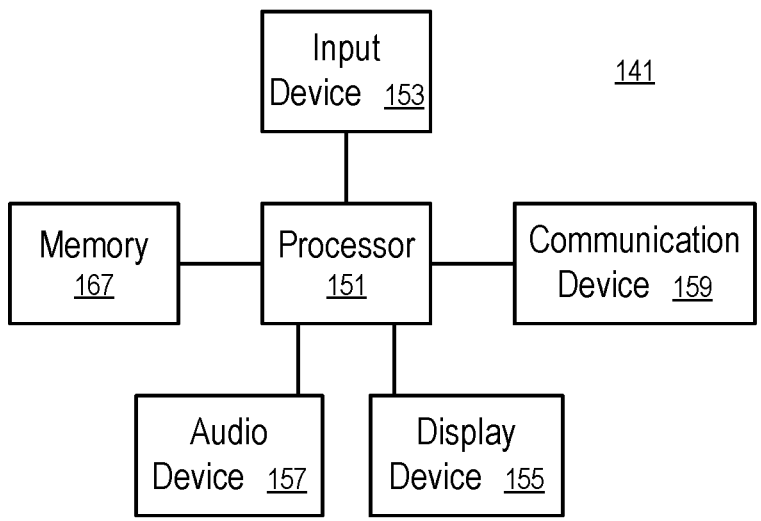
FIG. 6 illustrates an account identifying device according to one embodiment.
Figure 7:
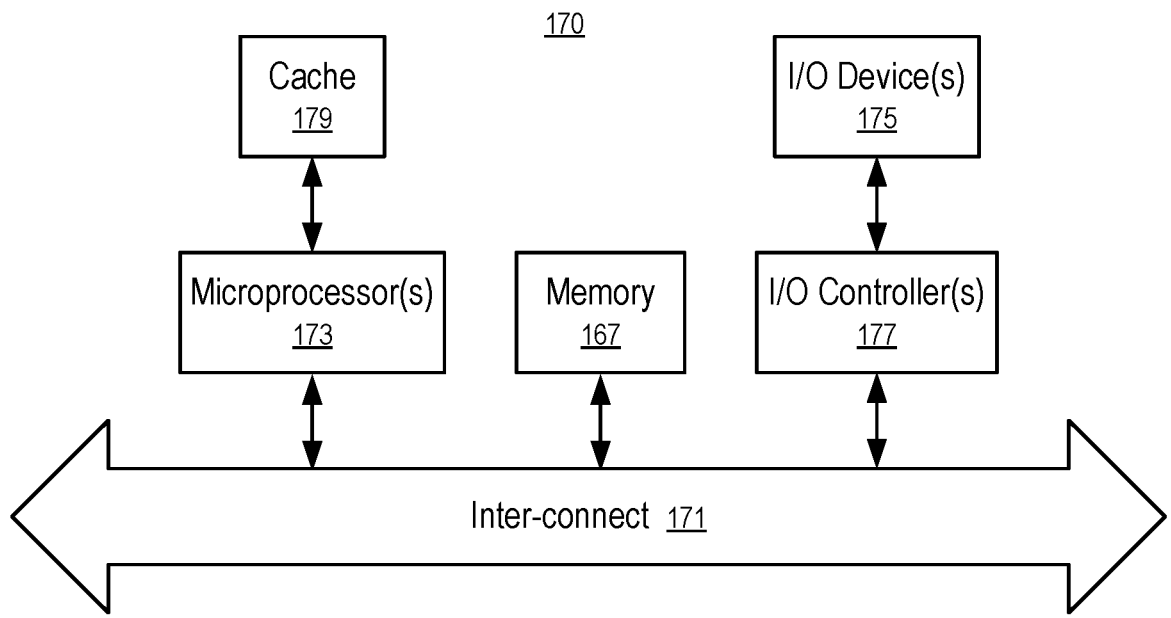
FIG. 7 illustrates a data processing system according to one embodiment.

FIGS. 5 and 6 illustrate examples of transaction terminals (105) and account identification devices (141). FIG. 7 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 1, 4-7, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. App. Pub. No. 2011/0054981, entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. Pat. App. Pub. No. 2011/0054981, entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having a periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. Pat. App. Pub. No. 2010/0280882, entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. Pat. App. Pub. No. 2008/0319843, entitled "Supply of Requested Offer Based on Point-of Service to Offeree Distance," U.S. Pat. App. Pub. No. 2008/0300973, entitled "Supply of Requested Offer Based on Offeree Transaction History," U.S. Pat. App. Pub. No. 2009/0076896, entitled "Merchant Supplied Offer to a Consumer within a Predetermined Distance," U.S. Pat. App. Pub. No. 2009/0076925, entitled "Offeree Requested Offer Based on Point-of Service to Offeree Distance," and U.S. Pat. App. Pub. No. 2010/0274627, entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

Further details about targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

In one embodiment, the portal (143) is configured to identify the consumer account (146) based on the IP address identified in the user data (125) through mapping the IP address to a street address.

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. Pat. App. Pub. No. 2011/0093327, entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

The correlator (117) is configured in one embodiment to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. Pat. App. Pub. No. 2011/0035278, entitled "Systems and Methods for Closing the Loop between Online Activities and Offline Purchases," the disclosure of which application is incorporated herein by reference.

Loyalty Program

In one embodiment, the transaction handler (103) uses the account data (111) to store information for third party loyalty programs.

Figure 8:
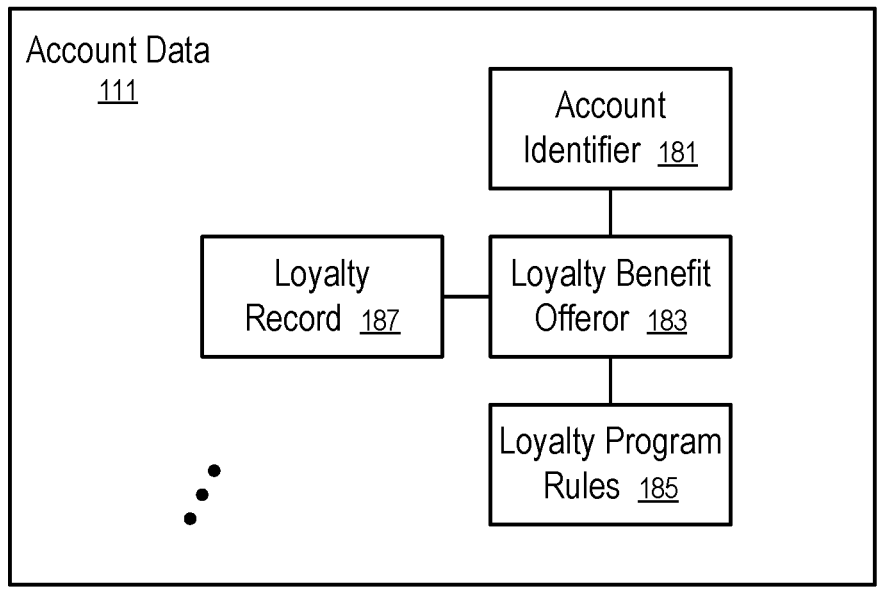
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

Details on loyalty programs in one embodiment are provided in U.S. Pat. App. Pub. No. 2011/0087530, entitled "Systems and Methods to Provide Loyalty Programs," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 9:
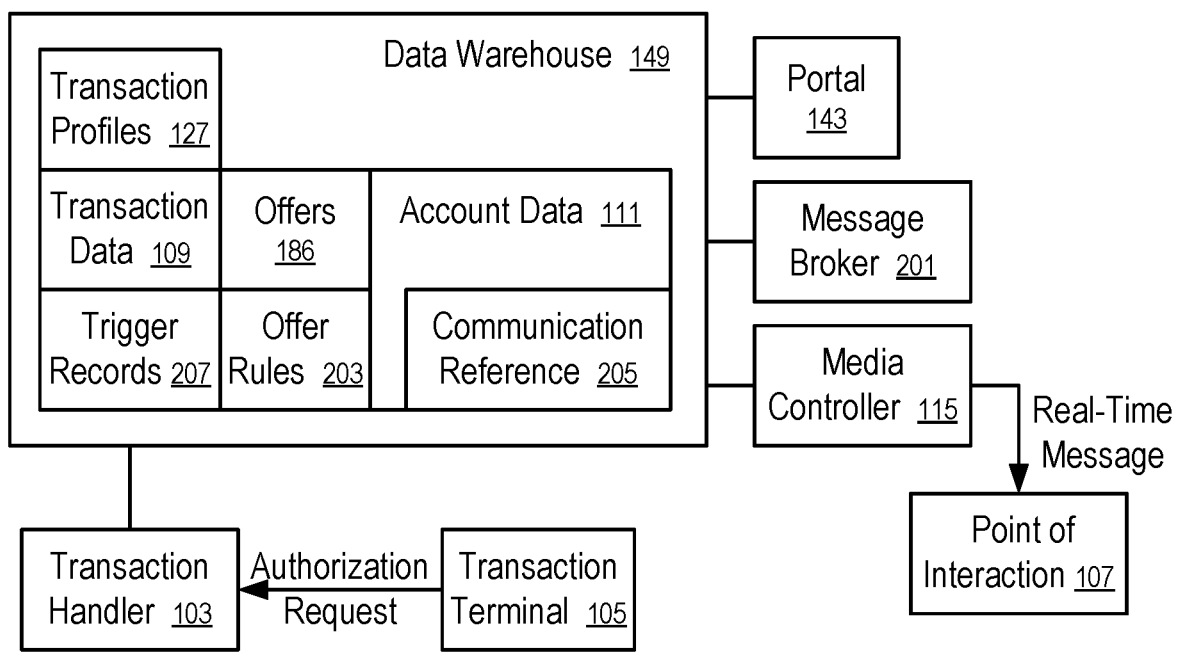
FIG. 9 shows a system to provide real-time messages according to one embodiment.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal (105), or with a delay not long enough to cause the user (101) to have the impression that the message is in response to an action other than the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller (115) to generate, the real-time message to provide the offers (186) to the user (101). For example, the offer (186) may include a discount, incentive, reward, rebate, gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. patent application Ser. No. 13/113,710, filed May 23, 2011, assigned Pub. No. 2011/0288918 and entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via mobile phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

In one embodiment, the portal (143) is to provide data insight to merchants and/or advertisers. For example, the portal (143) can provide the transaction profile (127) of the user (101), audience segmentation information, etc.

In one embodiment, the portal (143) is to allow the merchants and/or advertisers to define and manage offers (186) for their creation, fulfillment and/or delivery in messages.

In one embodiment, the portal (143) allows the merchants and/or advertisers to test, run and/or monitor the offers (186) for their creation, fulfillment and/or delivery in messages.

In one embodiment, the portal (143) is to provide reports and analytics regarding the offers (186).

In one embodiment, the portal (143) provides operation facilities, such as onboarding, contact management, certification, file management, workflow assistance, etc. to assist the merchants and/or advertisers to complete the tasks related to the offers (186).

In one embodiment, the portal (143) allows the user (101) to opt in or opt out of the real-time message delivery service.

In one embodiment, an advertiser or merchant can select an offer fulfillment method from a list of options, such as statement credits, points, gift cards, e-certificates, third party fulfillment, etc.

In one embodiment, the merchant or advertiser is to use the "off the rack" transaction profiles (127) available in the data warehouse (149). In one embodiment, the merchant or advertiser can further edit parameters to customize the generation of the transaction profiles (127) and/or develop custom transaction profiles from scratch using the portal (143).

In one embodiment, the portal (143) provides a visualization tool to allow the user to see clusters of data based on GeoCodes, proximity, transaction volumes, spending patterns, zip codes, customers, stores, etc.

In one embodiment, the portal (143) allows the merchant or advertiser to define cells for targeting the customers in the cells based on date/time, profile attributes, map to offer/channel/creative, condition testing, etc.

In one embodiment, the portal (143) allows the merchant or advertiser to monitor the system health, such as the condition of servers, files received or sent, errors, status, etc., the throughput by date or range, by program, by campaign, or by global view, and aspects of current programs/offers/campaigns, such as offer details, package audit reports, etc. In one embodiment, reporting includes analytics and metrics, such as lift, conversion, category differentials (e.g., spending patterns, transaction volumes, peer groups), and reporting by program, campaign, cell, GeoCode, proximity, ad-hoc, auditing, etc.

Figure 10:
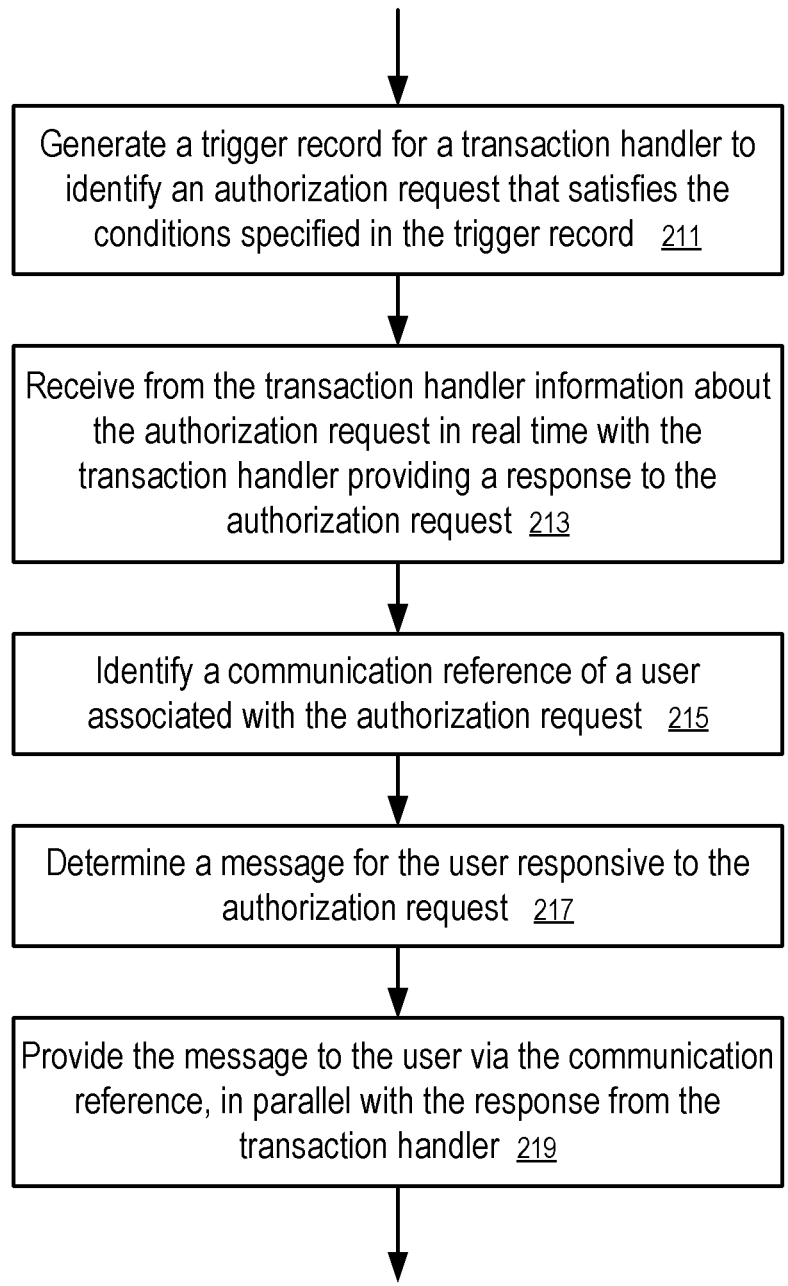
FIG. 10 shows a method to provide real-time messages according to one embodiment.

FIG. 10 shows a method to provide real-time messages according to one embodiment. In FIG. 10, a computing apparatus is to generate (211) a trigger record (207) for a transaction handler (103) to identify an authorization request that satisfies the conditions specified in the trigger record (207), receive (213) from the transaction handler (103) information about the authorization request in real-time with the transaction handler (103) providing a response to the authorization request to a transaction terminal (105), identify (215) a communication reference (205) of a user (101) associated with the authorization request, determine (217) a message for the user (101) responsive to the authorization request, and provide (219) the message to the user (101) at a point of interaction (107) via the communication reference (205), in parallel with the response from the transaction handler (103) to the transaction terminal (105).

In one embodiment, the computing apparatus includes at least one of: a transaction handler (103), a message broker (201), a media controller (115), a portal (143) and a data warehouse (149).

Merchant Aggregator

In one embodiment, real-time information about transactions is communicated to a merchant aggregator, which has a plurality of merchants as clients. The merchant aggregator may provide offers (186) on behalf of the merchants, service loyalty programs on behalf of the merchants, provide rewards to customers (e.g., user (101)) for their interaction with the merchants, etc. The real-time information about the transactions allows the merchant aggregator to provide new services and improve existing services.

In one embodiment, the merchants and/or the customers (e.g., user (101)) are required to enroll with the merchant aggregator to receive the services. A portal (143) is configured to match the identities of the merchants and customers as known to the merchant aggregator with the identities of the merchants and account holders as known to the transaction handler (103).

Figure 11:
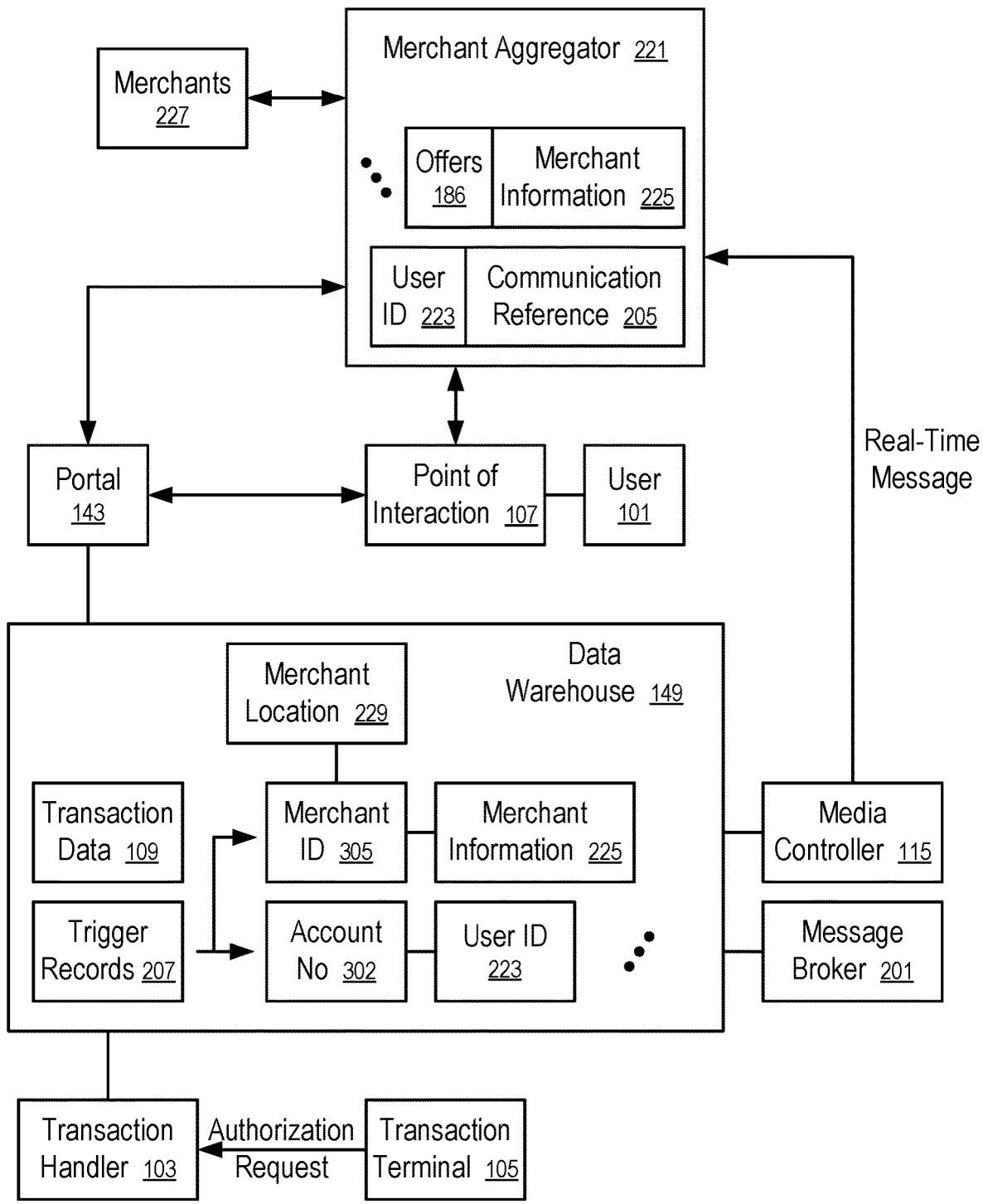
FIG. 11 shows a system configured to communicate via a merchant aggregator according to one embodiment.

FIG. 11 shows a system configured to communicate via a merchant aggregator according to one embodiment. In FIG. 11, the merchant aggregator (221) is configured to communicate with merchants (227) to enroll the merchants (227) for the services of the system.

In one embodiment, when the merchant aggregator (221) enrolls a new merchant, the merchant aggregator provides merchant information (225) to the portal (143) of the transaction handler (103) to request the portal (143) and/or the transaction handler (103) to monitor the transactions of the respective merchant (227).

In one embodiment, the merchant information (225) used by the merchant aggregator (221) to identify the merchant (227) may include the business data (e.g., corporation data, corporation name, consumer-facing name, "doing business as" names, names of affiliates and/or subsidiaries), addresses and store locations, etc. of the merchant (227). In one embodiment, the merchant information (225) further includes information about the acquirer representing the merchant, merchant category, and/or other relevant information that is helpful in identifying the merchant in the transaction processing network having the transaction handler (103) interconnecting acquirers representing respective merchants and issues representing respective users (101) of consumer accounts (146).

For example, in one embodiment, the merchant aggregator (221) provides the merchant information (225) via a spreadsheet identifying a list of merchants (227). In the spreadsheet, each merchant (227) is identified via the corporate name of the merchant (227) and the consumer-facing name of the merchant. For less well known merchants (e.g., small businesses), the spreadsheet further the name of the acquiring bank that represents the merchant (227) in processing transactions to be processed via the transaction handler (103). In one embodiment, the spreadsheet further includes the desired starting date of monitoring the transactions of the merchants (227) identified in the spreadsheet and the expected ending date of monitoring the transactions of the merchant (227) for the merchant aggregator (221).

In one embodiment, the portal (143) is configured to provide a user interface that allows the merchant aggregator (221) to specify data for the creation of the trigger records (207) associated with an offer campaign. For example, the user interface in one embodiment allows the merchant aggregator (221) to create an offer campaign associated with one of the merchants (227) identified in the spreadsheet provided to identify the merchants (227). To support the offer campaign, the user interface is configured to allow the merchant aggregator (221) to specify rules to monitor the transactions of the respect merchant (227). For example, the rules may identify a date to start testing of the monitoring of the transactions of the merchant (227), a date to send the monitoring of the transactions of the merchant (227) for the purpose of the offer campaign, a request for a notification of transactions provided in real-time as the processing of the authorization requests of the respective transactions of the merchant (227), and/or a request for a notification of transactions provided in real-time as the processing of the settlement requests of the respective transactions of the merchant (227). In one embodiment, the user interface further allows the merchant aggregator (221) to specify other requirements to select transactions to be monitored, such as requirements based on transaction amount, transaction time, characteristics of the user (101) purchasing from the merchant (227), etc. In one embodiment, the user interface further allows the merchant aggregator (221) to specify messages to be transmitted, in a way as illustrated in FIG. 9, to the respective user (101) transacting with the merchant (227), in response to the transactions detected according to the offer rules.

In one embodiment, the portal (143) is configured to correctly identify transactions associated with the enrolled merchant (227) based on the merchant information (225), and calculate the location of the transactions to enable location based services associated with the offer (186) of the merchant (227).

In one embodiment, based on the merchant information (225), the portal (143) is configured to identify one or more merchant IDs (305) that are configured to be used in authorization requests for transactions of the merchant (227) identified by the merchant information (225). The identified merchant ID (305) is used to generate the trigger records (207) for monitoring the transactions of the merchant (227) identified by the merchant information (225) provided by the merchant aggregator (221).

In one embodiment, the account holders (e.g., user (101)) are required to enroll with the system to provide the consent for the media controller (115) to send the transaction information of the account holders (e.g., user (101)) to the merchant aggregator (221), and for the media controller (115) and/or the merchant aggregator (221) to send messages to the point of interaction (107) of the user (101) based on the transaction information.

In FIG. 11, after user enrollment, the user (101) of the consumer account (146) is identified to be associated with a user ID (223) used by the merchant aggregator (221) to identify the user (101). The user (101) may further provide the communication reference (205) to the merchant aggregator (221) to receive offers (186), rewards, notifications, alerts, etc. The transaction handler (103) is configured to use the trigger records (207) containing the account number (302) of the user (101) to detect the transactions of the user (101).

To associate the account number (302) with the user ID (223) in one embodiment, the account number (302) of the consumer account (146) of the user (101) is identified to the portal (143) during the user enrollment and stored in the data warehouse (149) in association with the user ID (223).

For example, during the user enrollment process, the point of interaction (107) (e.g., a web browser, a mobile phone) of the user (101) interacting with the merchant aggregator (221) is redirected in one embodiment from the merchant aggregator (221) to the portal (143) with a reference to the user ID (223); and in response, the portal (143) provides a user interface to the point of interaction (107) of the user (101) to specify the account number (302). After the account number (302) specified by the user (101) is validated and/or authenticated (e.g., via security code, person identification number, security questions, security devices, etc.), the account number (302) is associated with the user ID (223) in the data warehouse (149) of the transaction handler (103).

In one embodiment, more than one account number (302) of the consumer accounts (146) of the user (101) can be associated with the single user ID (223) used by the merchant aggregator (221) to represent the user (101).

In one embodiment, the user ID (223) is assigned to the user (101) by the merchant aggregator (221) during the enrollment process. Alternatively, the portal (143) may generate and assign the user ID (223) for the user during the enrollment process and provide the user ID (223) to the merchant aggregator (221) to complete the enrollment of the user (101).

In one embodiment, during the enrollment process, the user (101) provides the account number (302) to the merchant aggregator (221), which indicates the association between the account number (302) and the user ID (223) to the portal (143) of the transaction handler (103); and the user ID (223) is subsequently used to identify the user (101) in messages to the merchant aggregator (221). Alternatively, the account number (302) may be used directly to identify the user (101), when the real-time message from the media controller (115) to the merchant aggregator (221) is transmitted over a secure communication channel.

In one embodiment, the trigger record (207) is generated based at least in part on the account number (302) and the merchant ID (305) to monitor the transactions between the user (101) and the merchant (227). When the authorization request from the transaction terminal (105) of the merchant (227) identifies the account number (302) and the merchant ID (305), as required by the trigger record (207) (and satisfies other requirements of the trigger record (207), such as requirements related to the date and time of the transaction, the amount of the transaction, etc.), the transaction handler (103) causes the message broker (201) to generate a message and transmit the message to the merchant aggregator (221), in real-time with the processing of the transaction, to inform the merchant aggregator (221) of the transaction.

In one embodiment, the data warehouse (149) stores the merchant location (229) for the merchant ID (305) associated with the transaction terminal (105).

In one embodiment, in response to the authorization request from the transaction terminal (105), the merchant location (229) of the transaction terminal (105) is determined and included in the real-time message generated by the message broker (201) and provided to the merchant aggregator (221) in a generic, machine-readable format (e.g., XML). Based on the information provided in the real-time message, the merchant aggregator (221) may use the communication reference (205) to communicate offers (186), rewards, messages, notifications, alerts, etc. to the point of interaction (107) of the user (101), such as via messages to a mobile phone identified by the communication reference (205) and/or a mobile application running on the mobile phone of the user (101).

In FIG. 11, the merchant aggregator (221) is configured to communicate with the point of interaction (107) of the user (101) in response to the real-time message from the media controller (115). Alternatively or in combination, the data warehouse (149) may store the communication reference (205), which is used by the media controller (115) to provide one or more separate real-time messages related to location-based offers (186) to the point of interaction (107) of the user (101) without going through the merchant aggregator (221).

In one embodiment, a merchant (227) may have a number of subsidiaries with different names and locations. In response to the merchant information (225), merchant data related to merchant accounts (148) are searched to identify a set of possible matches to the merchant information (225), which may be further communicated to the merchant aggregator (221) for confirmation. For example, in one embodiment, each matched merchant ID is augmented with the respective address of the transaction terminals operated by the respective merchant entity; and the merchant (227) may further confirm the enrollment of the respective merchant entity. In one embodiment, the names and addresses of the merchant information (225) are matched with the names and addresses of the merchant data for merchant accounts (148) to identify the merchant entity that is enrolled via the merchant information (225).

In one embodiment, a plurality of merchant IDs (305) may match the merchant information (225) specified by the merchant aggregator (221); and one or more merchant locations corresponding to the locations of the transaction terminals (105) may associate with a merchant ID (305) in the data warehouse (149). When the trigger record (207) matches a transaction, the merchant location (229) corresponding to the transaction terminal (105) from which the authorization request is received is used for the location-based service provided by the merchant aggregator (221) and/or the message broker (201).

Figure 12:
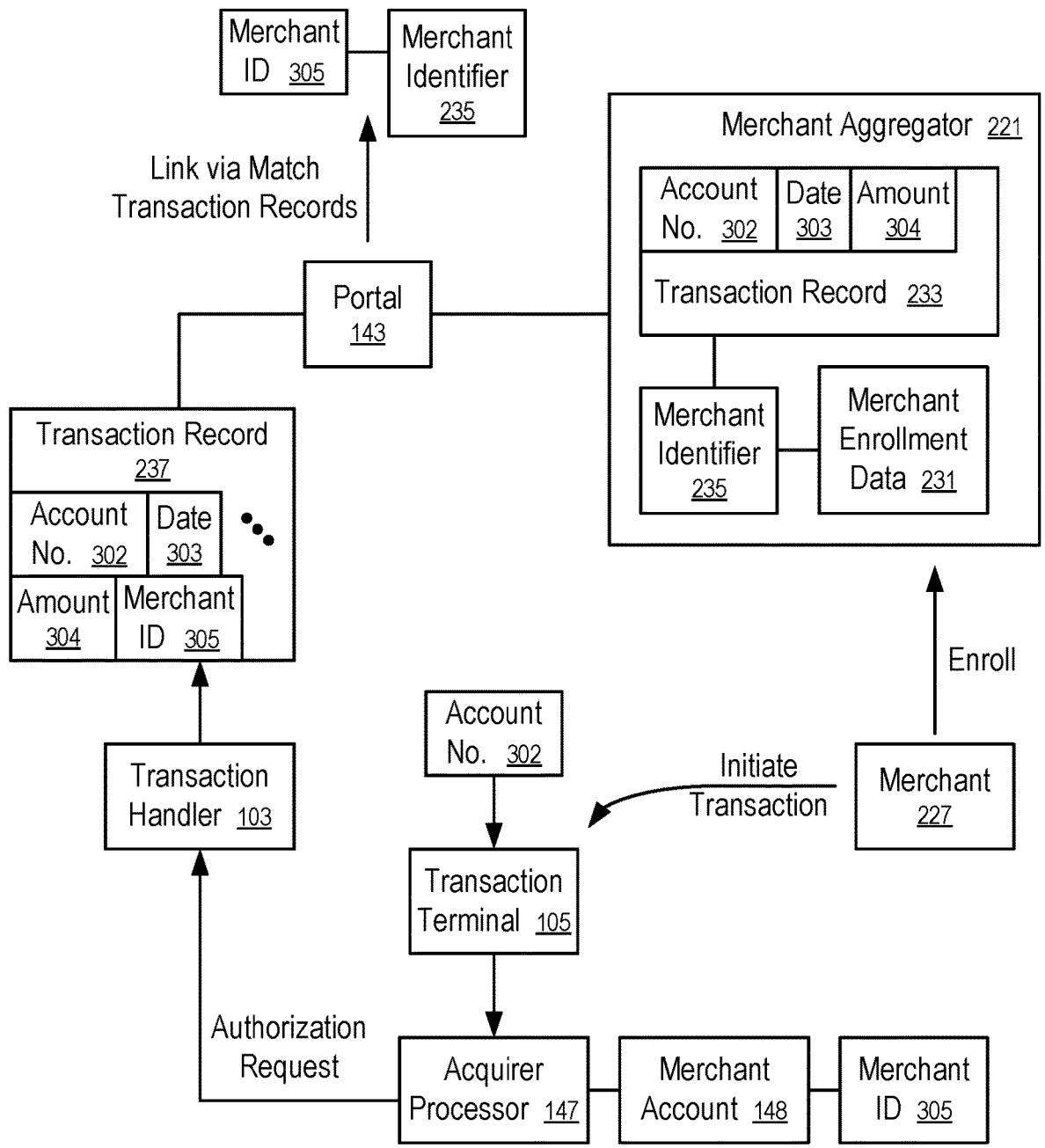
FIG. 12 shows a system to enroll a merchant according to one embodiment.

FIG. 12 shows a system to enroll a merchant according to one embodiment. In FIG. 12, a transaction using a predetermined account number (302) is used to correlate the merchant information (225) with the merchant ID (305) used in the transaction messages processed by the transaction handler (103).

In FIG. 12, when the merchant (227) enrolls with the merchant aggregator (221), the merchant enrollment data (231), including the merchant information (225), is generated to identify the names and locations of the enrolled merchant (227). The merchant aggregator (221) uses the merchant identifier (235) to represent the enrolled merchant (227).

In one embodiment, to correlate the merchant identifier (235) with a merchant ID (305) associated with the merchant account (148), the merchant (227) is instructed to use the account number (302) to initiate a transaction using the transaction terminal (105) at the enrolled location of the merchant (227). After the transaction is initiated, the acquirer processor (147) connected to the transaction terminal (105) provides the authorization request to the transaction handler (103), which stores the transaction record (237) that includes the predetermined account number (302), the merchant ID (305), the date (303) of the transaction, the amount (304) of the transaction, etc.

In one embodiment, the merchant aggregator (221) stores a separate transaction record (233) including certain information about the transaction as identified by the enrolling merchant (227), such as the predetermined account number (302), the date (303) (or the time period in which transaction is performed), and the amount (304), etc.

In FIG. 12, the portal (143) is configured to match the transaction records (233 and 237) to link the merchant ID (305) to the merchant identifier (235).

For example, during the enrollment period, the portal (143) is configured to retrieve transactions records (237) for the predetermined account number (302) from the data warehouse (149); and the merchant aggregator (221) is configured to provide its transaction record (233) with the merchant identifier (235) to the portal (143). The portal (143) is configured to match the transaction records (233 and 237) based on the account number (302), the transaction date (303), and/or the transaction amount (304). When a match is detected, the merchant ID (305) from the transaction record (237) generated by the transaction handler (103) is linked to the merchant identifier (235) associated with the transaction record (233) stored by the merchant aggregator (221).

Using the system of FIG. 12, the merchant (227) can selectively enroll certain transaction terminals (105) operated under certain names and/or at certain locations. Thus, the merchant (227) may enroll a portion of the transaction terminals (105) under control of the merchant (227) but not another portion of the transaction terminals (105) under control of the merchant (227)

In one embodiment, the transaction record (233) further includes the location information of the transaction terminal (105), which can be used for location based services. For example, in reporting the transaction initiated via using the predetermined account number (302) at the transaction terminal (105), the merchant (227) may specify the location of the transaction terminal (105) via a mobile device, a mobile application, a map application, or a street address. Thus, the location of the transaction terminal (105) is associated with the merchant ID (305) and/or the transaction terminal (105).

In one embodiment, the data warehouse (149) stores location information of transaction terminal (105) (e.g., as reported by the acquirer processor (147)) and provides the location information to the merchant aggregator (221) after the merchant ID (305) is linked to the merchant identifier (235) via the transaction record (237) for the transaction initiated on the transaction terminal (105).

In one embodiment, during the enrollment process, the merchant aggregator (221) instructs the merchant (227) to perform the transaction according to the data stored in the transaction record (223) and provides the transaction record (233) to the portal (143). In response, the portal (143) generates a trigger record (207) to detect the transaction that is subsequently initiated by the merchant at the transaction terminal (105). In one embodiment, the trigger record (207) is configured to cause the portal (143) to link the merchant ID (305) from the transaction record (237) of the identified transaction with the merchant identifier (235) associated with the transaction record (233) used to generate the trigger record (207).

Figure 13:
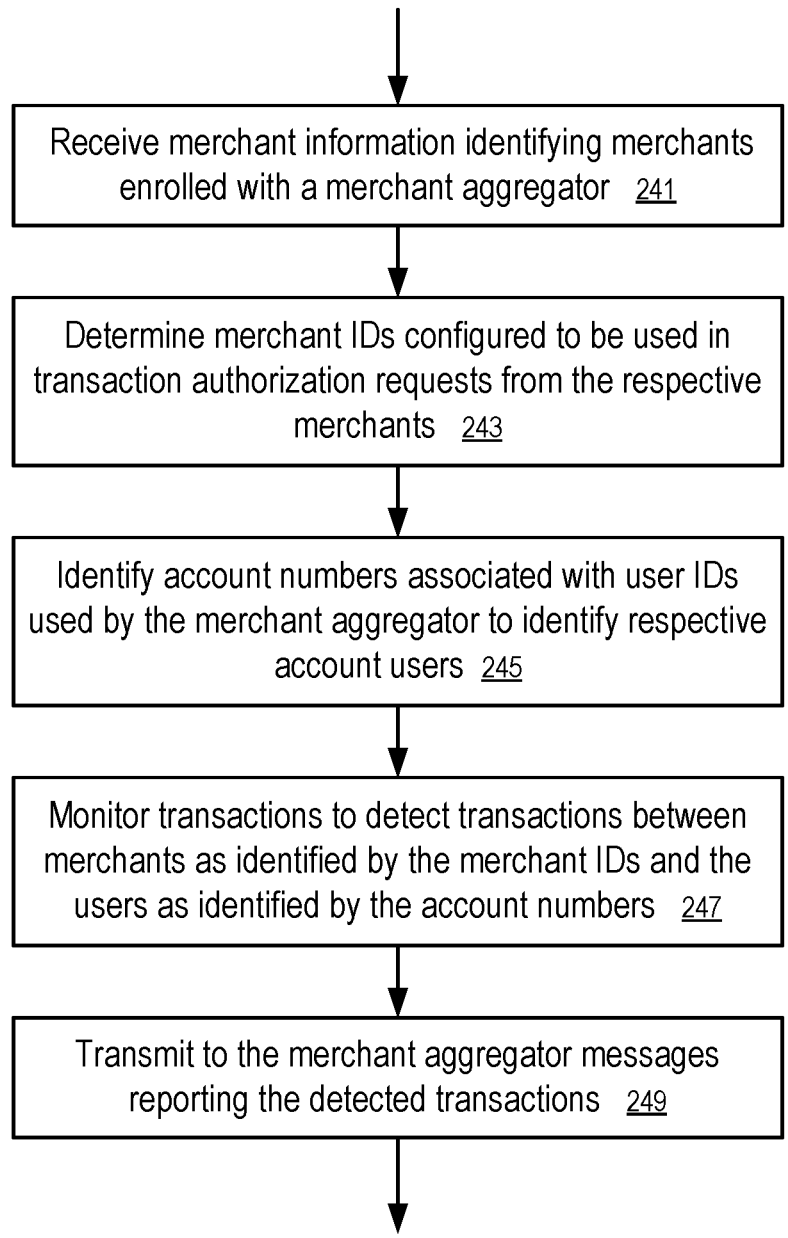
FIG. 13 shows a method to provide real-time notifications of transactions according to one embodiment.

FIG. 13 shows a method to provide real-time notifications of transactions according to one embodiment. In FIG. 13, a computing apparatus is configured to receive (241) merchant information (225) identifying merchants (227) enrolled with a merchant aggregator (221), determine (243) merchant IDs (305) configured to be used in transaction authorization requests from the respective merchants (227), identify (245) account numbers (302) associated with user IDs (223) used by the merchant aggregator (221) to identify respective account users (101), monitor (247) transactions to detect transactions between merchants (227) as identified by the merchant IDs (305) and the users (101) as identified by the account numbers (302), and transmit (249) to the merchant aggregator (221) messages reporting the detected transactions.

In one embodiment, the computing apparatus/system includes at least one of: the portal (143), the data warehouse (149), the transaction handler (103), the medial controller (115), and the message broker (201).

Generalized Notification

In one embodiment, the information about transactions provided in real-time with the processing of the transactions is configured to be used in open loop communities, where hundreds or thousands of vendors may use the information to provide separate services. Each of the vendors can have their own requirements about how to send notifications to their users.

In one embodiment, a standardized notification is provided, by the centralized message broker (201) coupled with the data warehouse (149) and the transaction handler (103), to a set of service portals that are configured to provide diverse services to their customers based on the real-time transaction-related information provided in the standardized notification.

For example, some of the vendors can successfully leverage the core offerings of real-time transaction-related information to improve their services. For example, some of the vendors can use the real-time transaction-related information to extend the real-time message services offered by the system illustrated in FIG. 9 to support vendor specific features. Thus, the message broker (201) does not have to implement all features desired by the vendors and their customers. The implementation of the standardized notification reduces the burden on the message broker (201), and improves the efficiency and flexibility of the overall system.

In one embodiment, the message broker (201) is configured to provide a generic message in a preformatted template to service portals, which can be configured to receive the generic message and perform vendor specific tasks to provide services, such as customized notifications, offer presentations, coupon redemptions, etc.

In one embodiment, the portal (143) coupled with the data warehouse (149) and/or the transaction handler (103) is configured to provide a self-service user interface that allows a vendor to register a destination for a standardized notification generated by the message broker (201). The destination can be a third party service portal operated by the vendor. In one embodiment, the destination is specified by a uniform resource locator/universal resource locator (URL). The portal (143) is configured to use a web interface associated with the URL to provide the standardized notification to the registered destination.

Figure 14:
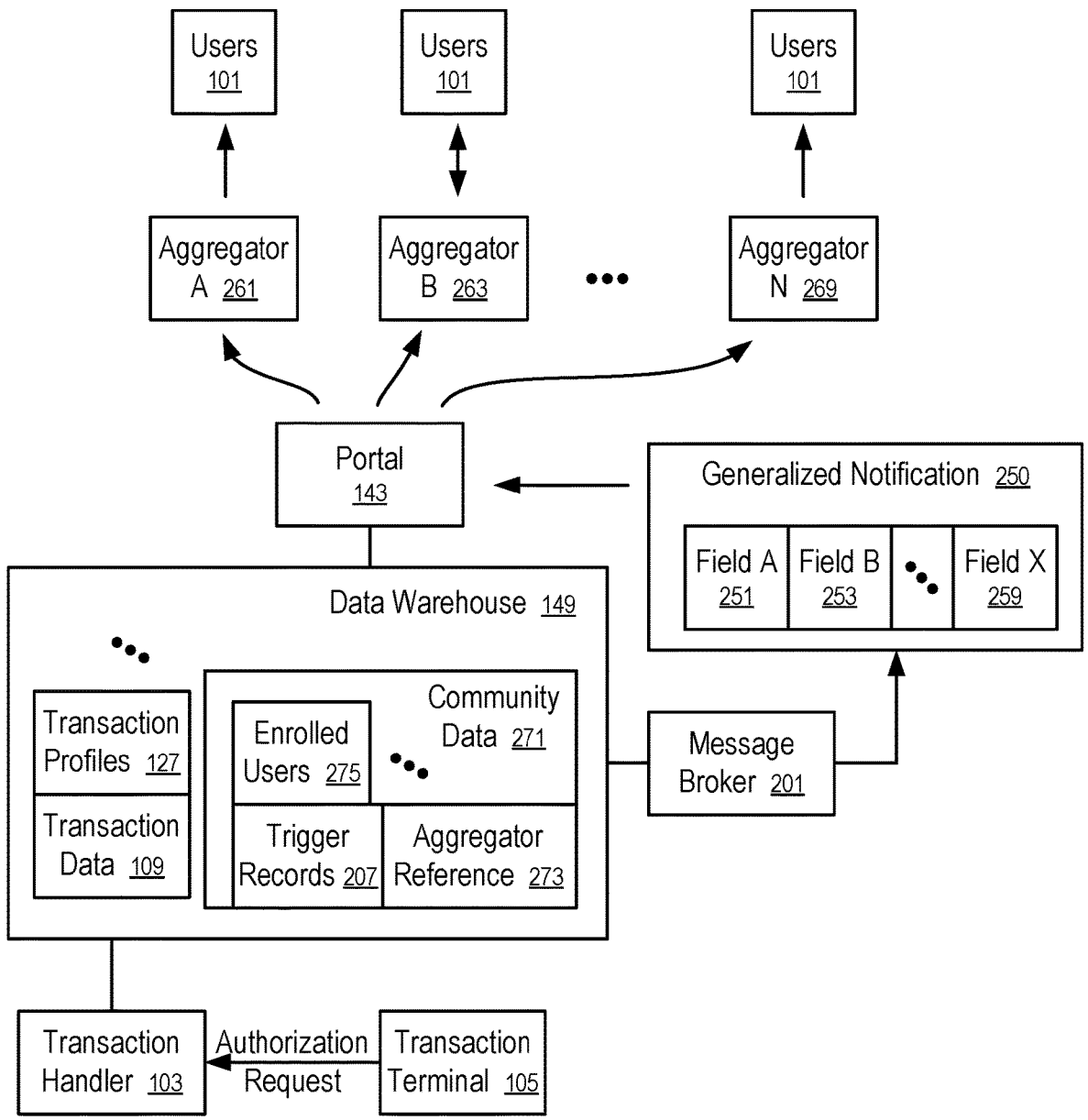
FIG. 14 illustrates a system to provide generalized notifications to facilitate diverse services according to one embodiment.

FIG. 14 illustrates a system to provide generalized notifications to facilitate diverse services according to one embodiment.

In one embodiment, notification services are organized according to community. A community includes at least one merchant and a plurality of users enrolled in the community to receive offers, alerts, notifications and/or other services from the merchants in the community. When a community that provides services based at least in part on the generalized notifications from the message broker (201) is created or updated, a destination for receiving the generalized notifications for the community is specified via a URL and stored as a configuration parameter of the community.

For example, in FIG. 14, a set of community aggregators (261, 263, . . . , 269) are configured to use the generalized notification (250) generated by the message broker (201) to provide services to their respective users (101). The data warehouse (149) is configured to store the community data (271) for the respective community, such as the users (101) and merchants associated with the aggregator (261, 263, . . . , or 269).

In FIG. 14, the community data (271) includes the aggregator reference (273) that identifies the aggregator (261, 263, . . . , or 269) as the destination of the generalized notification (250) generated in accordance with the trigger records (207) that represent the requests for the generalized notifications (e.g., 250). In one embodiment, the aggregator reference (273) includes a URL of the aggregator (261, 263, . . . , or 269); and the portal (143) is configured to provide the generalized notification (250) via a web service provided at the URL.

In one embodiment, when a user (101) is enrolled or updated in a community, the merchant/vendor/aggregator may optionally collect information about the user (101) that is required to address their specific requirements. In one embodiment, the community data (271) stored in the data warehouse (149) stores for the community the information about enrolled users (275) in the community to monitor the transaction of the enrolled users (275).

In one embodiment, the data warehouse (149) stores the user enrollment information to associate the users enrolled in the community with the merchant/vendor/aggregator in the community.

In one embodiment, the portal (143) provides an interface that allows an aggregator/merchant/vendor to define a triggering event, the occurrence of which is configured to cause the generation of the generalized notification (250) and the transmission of the generalized notification (250) to the pre-defined destination for the community (e.g., using the aggregator reference (273) and the portal (143)).

In FIG. 14, a trigger record (207) is generated according to the triggering event specified via the portal (143), and is used to detect events matching the event definition. For example, the trigger record (207) is configured to monitor the processing of authorization requests that satisfy certain conditions specified in the trigger record (207). The information about the enrolled users (275) limits the monitoring to transactions of the enrolled users (275) in the community; and the trigger record (207) may further limit the monitoring to a set of users that satisfy certain requirements formulated based on the transaction profile (127), demographic information, etc. In one embodiment, the trigger record (207) is configured to detect certain transactions based on certain aspects of the transaction, such as transaction amount (304), transaction location, merchant category (306), transaction channel (307), etc. Other types of events include the settlement processing of a transaction, a user enrollment in the community, etc.

In one embodiment, when a transaction satisfying the requirements of the trigger record (207) is identified, an action specified in the trigger record (207) is triggered. An example of the action is the delivery of the generalized notification (250).

In one embodiment, the generalized notification (250) is in a standardized format, such as a message including a plurality of fields (251, 253, . . . , 259) in an Extensible Markup Language (XML). The plurality of fields (251, 253, . . . , 259) are pre-selected to report various aspects of the detected event. The set of fields (251, 253, . . . , 259) are selected based on the type of the event to be reported, but are independent from the destination/aggregator/merchant/vendor of the generalized notification (250).

In one embodiment, the trigger record (207) may identify a subset of the predefined set of fields (251, 253, . . . , 259) to improve efficiency in reporting. The message broker (201) is configured to generate the generalized notification (250) that contains the subset requested by the trigger record (207), but not the remaining subset of fields that are not requested by the trigger record (207).

The portal (143) is configured to use the aggregator reference (273) to deliver the generalized notification (250) to the respective aggregator (261, 263, . . . , or 269) (e.g., using a web service, or other communication channels, such as short text message, email, instant message, etc.). In one embodiment, the generalized notification (250) is generated by the message broker (201) and provided by the portal (143) in real-time as, or in parallel with, the processing of the authorization request for the transaction that satisfies the trigger record (207).

In one embodiment, the generalized notification (250) includes fields (e.g., 251, 253, . . . , 259) such as the type of the event, an identification of the event definition used to generate the trigger record (207), an identification of the user (101) with whom the detected event is associated, and other properties/attributes of the detected event.

Figure 15:
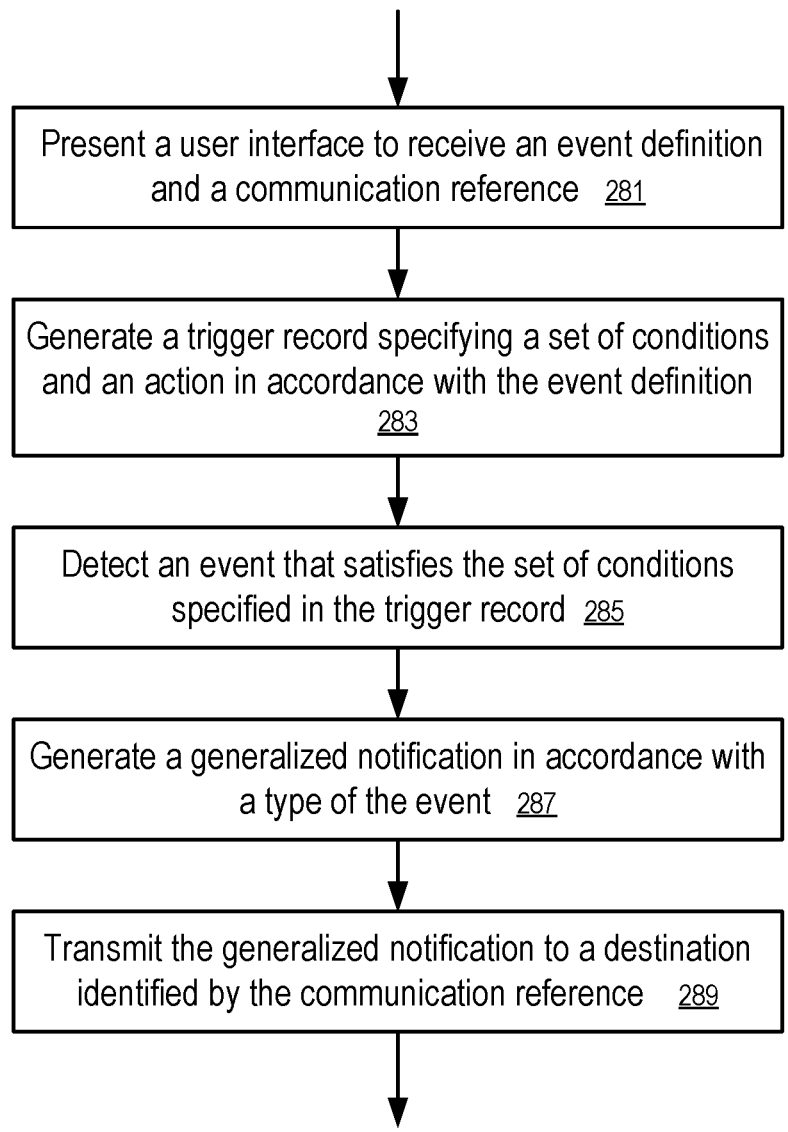
FIG. 15 illustrates a method to provide generalized notifications according to one embodiment.

FIG. 15 illustrates a method to provide generalized notifications according to one embodiment. In FIG. 15, a computing apparatus is configured to present (281) a user interface to receive an event definition and a communication reference (e.g., 273), generate (283) a trigger record (207) specifying a set of conditions and an action in accordance with the event definition, detect (285) an event (e.g., processing of an authorization request for a transaction) that satisfies the set of conditions specified in the trigger record (207), generate (287) a generalized notification (250) in accordance with a type of the event, and transmit (289) the generalized notification (250) to a destination identified by the communication reference (e.g., 273).

In one embodiment, the generalized notification (250) is configured in a way suitable for processing by a computing device (e.g., presented in XML).

In one embodiment, the computing apparatus/system includes at least one of: the portal (143), the message broker (201), the transaction handler (103) and the data warehouse (149).

Third Party Statement Credits

In one embodiment, a system and method is configured to provide a mechanism allowing a third party, not involved in a payment transaction made in a payment account, to provide a credit to the payment account as an offer benefit redeemed during the processing of the payment transaction. The mechanism includes a transaction handler of a payment processing network configured to provide transaction information relevant to the offer to the third party. If the third party determines that a qualifying transaction in the payment account is entitled to the benefit, the third party communicates a request, via an application programming interface (API), to a portal of the transaction handler for a credit to the payment account for the payment transaction; in response, the transaction handler generates a credit transaction for the payment account using a funding source of the third party and stores data associating the credit transaction with the qualifying transaction.

Figure 16:
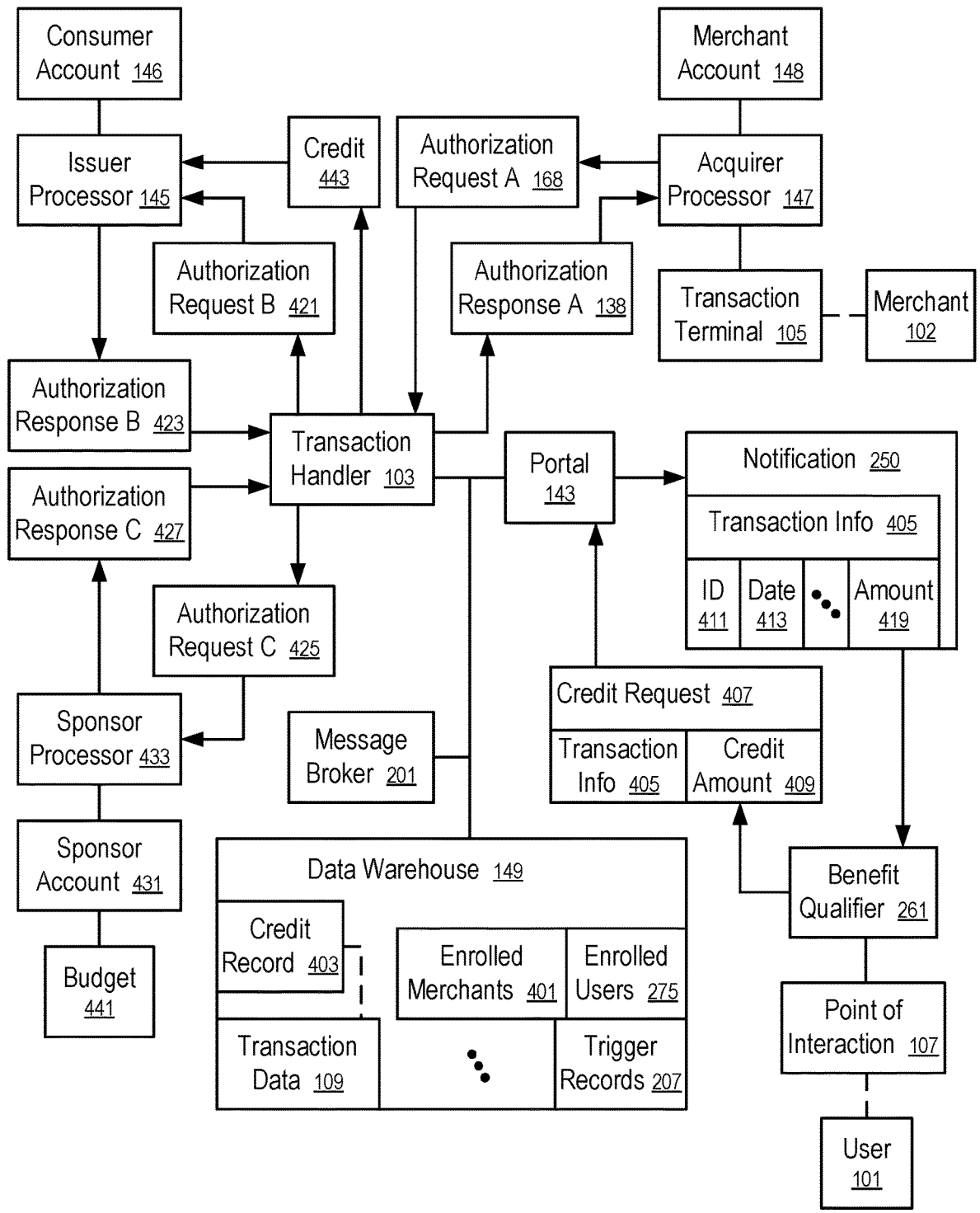
FIG. 16 shows a system to provide third party statement credits according to one embodiment.

FIG. 16 shows a system to provide third party statement credits according to one embodiment. In FIG. 16, the data warehouse (149) is configured to store trigger records (207) configured to detect transactions to be reported to a third party benefit qualifier (261).

The third party benefit qualifier (261) is not involved, or not required, in a traditional payment transaction between a merchant (102) having a merchant account (148) under control of the acquirer processor (147) and a user (101) having a consumer payment account (146) under control of the issuer processor (145). A transaction handler (103) of a payment processing network (e.g., as illustrated in FIG. 4) is configured to interconnect the acquirer processors (e.g., 147) and the issuer processors (e.g., 145) in the payment processing network.

In FIG. 16, the benefit qualifier (261) is configured to determine whether a transaction between the merchant and the user (101) is entitled to a benefit in a form of a statement credit.

For example, the benefit qualifier (261) may provide an offer of the benefit linked to the consumer account (146) of the user (101), such that when a transaction in the consumer account (146) satisfies the benefit redemption requirements of the offer, the benefit qualifier (261) may request that a statement credit be provided to the consumer account (146) of the user (101) as the benefit of the offer. The benefit of the offer may be funded by the respective merchant, or other sponsors, such as a manufacturer, a government entity, a charity organization, an advertiser, etc.

In FIG. 16, the data warehouse (149) is configured to store data identifying the enrolled merchants (401) and enrolled users (275) for the offers. The data identifying the enrolled merchants (401) and enrolled users (275) corresponds to the merchant accounts (e.g., 148) and the consumer accounts (e.g., 146) to allow the transaction handler (103) to detect transactions that may be of interest to the benefit qualifier (261). The data identifying the enrolled merchants (401) and enrolled users (275) may further include the participant IDs of the merchants (e.g., 102) and the users (e.g., 101) in the respective offer campaigns, and the identifications of the respective offers.

In one embodiment, the portal (143) is configured to receive input from the benefit qualifier (261) to generate the trigger records (207) to detect, from transactions processed by the transaction handler (103), a subset of transactions that are of interest to the benefit qualifier (261). The transaction handler (103) is coupled with the message broker (201) and/or the portal (143) to generate a notification (250) to the benefit qualifier (261), in accordance with the trigger records (207), in a way as illustrated in FIGS. 14 and 15 and discussed in the section entitled "GENERALIZED NOTIFICATION."

For example, when the user (101) makes a qualifying transaction at the transaction terminal (105) of the merchant (102), the transaction terminal (105) communicates an authorization request (168) for the transaction to the transaction handler (103) via the acquirer processor (147) that controls the merchant account (148) of the merchant (102).

In response to the authorization request (168), the transaction handler (103) determines that the transaction satisfies the requirements of the trigger record (207) for the notification (250) and cause the message broker (201) to generate, and the portal (143) to transmit, the notification (250) to the benefit qualifier (261).

In one embodiment, the notification (250) includes transaction information (405), such as a transaction ID (411), a transaction date (413), . . . , a transaction amount (419), etc. The notification (250) and/or the transaction information (405) may further identify the merchant (102) and the user (101) involved in the transaction, via the account information of the merchant account (148) and the consumer account (145) and/or participant IDs of the merchant (102) and the user (101). The notification (250) may further identify an offer associated with the trigger record (207) when the transaction reported in the notification (250) satisfies the requirements of the trigger record (207) and thus triggers the notification (250).

In FIG. 16, the benefit qualifier (261) is configured to determine whether the transaction identified by the transaction information (405) is entitled to a statement credit; and if so, the benefit qualifier (261) is configured to send a credit request (407) to the portal (143) using an application programming interface (API). The benefit qualifier (261) may optionally communicate with the point of interaction (107) of the user (101) to notify the user (101) of the credit being requested for the consumer account (146).

In FIG. 16, the credit request (407) is configured to include the transaction information (405) to identify the transaction for which the statement credit is issued, as well as the credit amount (409).

In one embodiment, the transmission of the notification (250) is initiated before, or in parallel with, the transmission of the authorization response (138).

In response to the authorization request (168) from the acquirer processor (147), the transaction handler (103) sends an authorization request (421) to the issuer processor (145) that controls the consumer account (146) of the user (101) to obtain the authorization response (423) from the issuer processor (145) for the payment transaction between the consumer account (146) and the merchant account (148). The transaction handler (103) is configured to provide the authorization response (138) to the acquirer processor (147) in view of the authorization response (423) received from the issuer processor (145).

In one embodiment, the credit request (407) is received in real time with the transmission of the authorization response (138) to the acquirer processor (147), or in parallel with the receiving of the authorization response (423) from the issuer processor (145).

Optionally, the notification (250) and/or the credit request (407) can be delayed after a period of time (e.g., after the transaction requested by the authorization request (168) is cleared and settled).

In response to the credit request (407), the transaction handler (103) is configured to validate the credit request (407) based on the transaction information (405) contained in the credit request (407) and/or identify the sponsor account (431) that funds the credit request (407). If the transaction information (405) corresponds to an authorized and/or a settled transaction (and other validation checks are satisfied), the credit request (407) is accepted; otherwise, the credit request (407) may be rejected. If rejected, the transaction handler (103) sends a response to the benefit qualifier (261) indicating the reason for rejection.

Examples of other validation checks include: 1) the referenced consumer account is still enrolled in the offers program; 2) the offer referenced in the credit request is active/not expired; 3) the amount of the credit is less than or equal to the qualifying purchase amount; 4) no prior credits have been issued that are associated with the qualifying purchase transaction referenced in the credit request (to prevent multiple credits being issued against the same transaction); and/or 5) the cost of the benefits for the offers program is within a predetermined budget constraint.

The sponsor account (431) may be identified based on the identification of offer associated with the credit request (407), or account information of the sponsor account (431) provided in the credit request (407).

In FIG. 16, the credit request (407) is received from the benefit qualifier (261). Alternatively, when the offer rules are stored in the data warehouse (149), the portal (143) and/or the transaction handler (103) can be configured to compute the credit amount (409) at the time of the authorization and/or settlement of the qualifying transaction between the consumer account (146) and the merchant account (148), without the credit request (407) from the benefit qualifier (261).

In response to the credit request (407) (or after the computing of the credit amount (409)), the transaction handler (103) is configured to communicate with the sponsor processor (433) of a sponsor account (431) that provides funds for the amount (409) of credit identified in the request (407).

For example, a sponsor account (431) may be a payment account under control of the sponsor processor (433). The payment account may be a debit account, a credit account, a prepaid account, a checking account, etc. For example, in response to the credit request (407), the transaction handler (103) may communicate an authorization request (425) to the sponsor processor (433) and obtain an authorization response (427) for the amount (409) of credit identified in the request (407).

In one embodiment, one or more rules can be configured with the sponsor account (431) to limit the use of funds in the sponsor account (431). For example, the sponsor account (431) may be limited by a budget (441) that has a predetermined spending limit with a predetermined time period (e.g., a day, a week, or a month). The budget (441) may be enforced by the sponsor processor (433) and/or the transaction handler (103).

Figure 18:
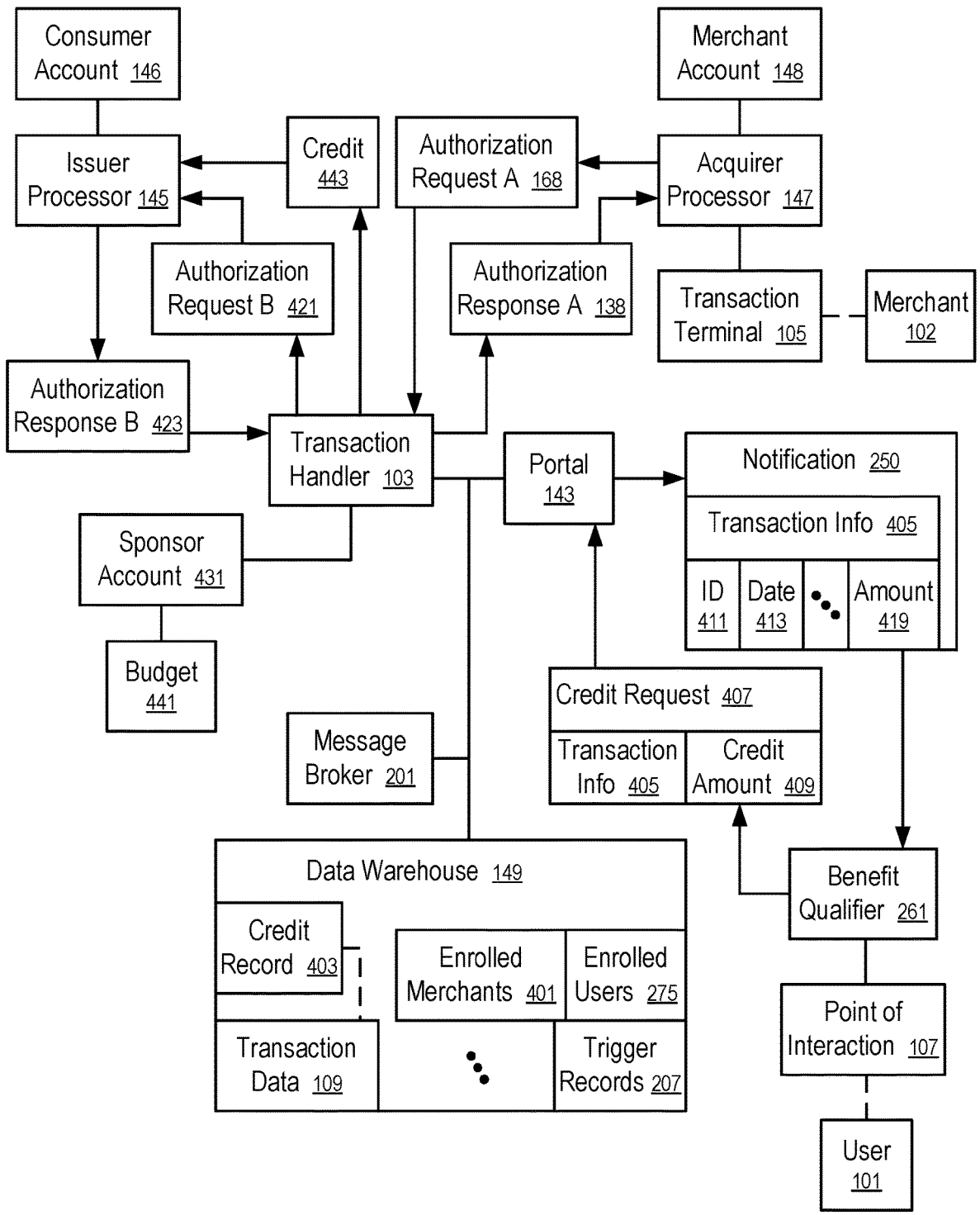
FIG. 18 shows another system to provide third party statement credits according to one embodiment.

FIG. 16 illustrates an example where the sponsor account (431) is under control of the sponsor processor (433) that is separate from the transaction handler (103). Alternatively, the transaction handler (103) is configured to control the sponsor account (431); and the function of the sponsor processor (431) is merged into the transaction handler (103), in a way as illustrated in FIG. 18. For example, the benefit qualifier (261) may establish a prepaid account as the sponsor account (431) with the transaction handler (103) to fund the credit requests (e.g., 407).

If there are sufficient funds for the amount (409) of credit specified in the request (407), the transaction handler (103) is configured to communicate a credit (443) to the issuer processor (145).

In one embodiment, the transaction handler (103) is configured to use a return clearing transaction message in compliance with a financial transaction message standard to communicate the credit (443). A return clearing transaction message is typically used by a merchant to process the refund due to a return of a previous purchase. In the present application, the use of the return clearing transaction message is used without requiring a prior payment from the consumer account (146) to the sponsor account (431); and the credit (443) is provided from the sponsor account (431) to the consumer account (146) (e.g., without providing in the return clearing transaction message a reference to a prior payment transaction, from the consumer account (146), to the merchant account (148) and/or the sponsor account (431)).

In one embodiment, since the return clearing transaction message for the credit (443) is initiated by the transaction handler (103) (e.g., instead of from a transaction terminal (105) of a merchant (102)), the transaction for the credit (443) is neutral in interchange fees (e.g., does not involve an interchange fee).

In one embodiment, the return clearing transaction message identifies both the merchant (102) and the benefit qualifier (261) as the benefit provider. Thus, the names of the merchant (102) and the benefit qualifier (261) can be provided on the statement of the consumer account (146) for the credit (443).

The transaction handler (103) is configured to store the transaction data (109) recording the qualifying transaction of the payment from the consumer account (146) to the merchant account (148), and store the credit record (403) showing the "return" transaction of the credit (443) from the sponsor account (431) to the consumer account (146). The transaction handler (103) is further configured to store data associating the transaction data (109) recording the qualifying transaction of the payment from the consumer account (146) to the merchant account (148) and the credit record (403) showing the return transaction of the credit (443) from the sponsor account (431) to the consumer account (146). Thus, the association of the credit record (403) and the transaction data (109) identifies the credit (421) as a refund, issued via the sponsor account (431), for the payment transaction between the merchant account (148) and the consumer account (146).

In FIG. 16, the notification (250) with the transaction information (405) and the API for the credit request (407) allows the benefit qualifier (261) to identify qualifying transactions and request credits (e.g., 443) without having to be a party in the transaction between the merchant account (148) and the consumer account (146). The novel use of the return clearing transaction message to provide the credit (443) via a sponsor account (431) that is separate from the merchant account (148) and the consumer account (146) provides flexibility in implementing statement credits and improves interoperability amount across various issuer processors. The data association of the credit record (403) and the transaction data (109) provides auditable data for transaction integrity checks.

In one embodiment, the communications of the notification (250) of the payment transaction and the credit request (407) are in response to the authorization request (168) and/or the authorization response (138) of the payment transaction. The credit (443) is transmitted to the issuer processor (145) is in response to the settlement of the payment transaction.

In one embodiment, the computation and authorization of the statement credit (e.g., as requested in the credit request (407)) are performed during the authorization of the payment transaction. Subsequently, the credit (443) is provided to the issuer processor (145) via refund protocol (e.g., a return clearing transaction message in an electronic payment processing system) in reponse to settlement of the payment transaction.

Alternatively, the credit (443) can be provided to the issuer processor (145) using the refund protocol upon approval of the payment transaction via the authorization response (138), prior to the settlement of the payment transaction.

In one embodiment, the transaction handler (103) is configured to settle the credit (443) based on, or in parallel with, the settlement of the payment transaction identified by the transaction information (405).

Figure 17:
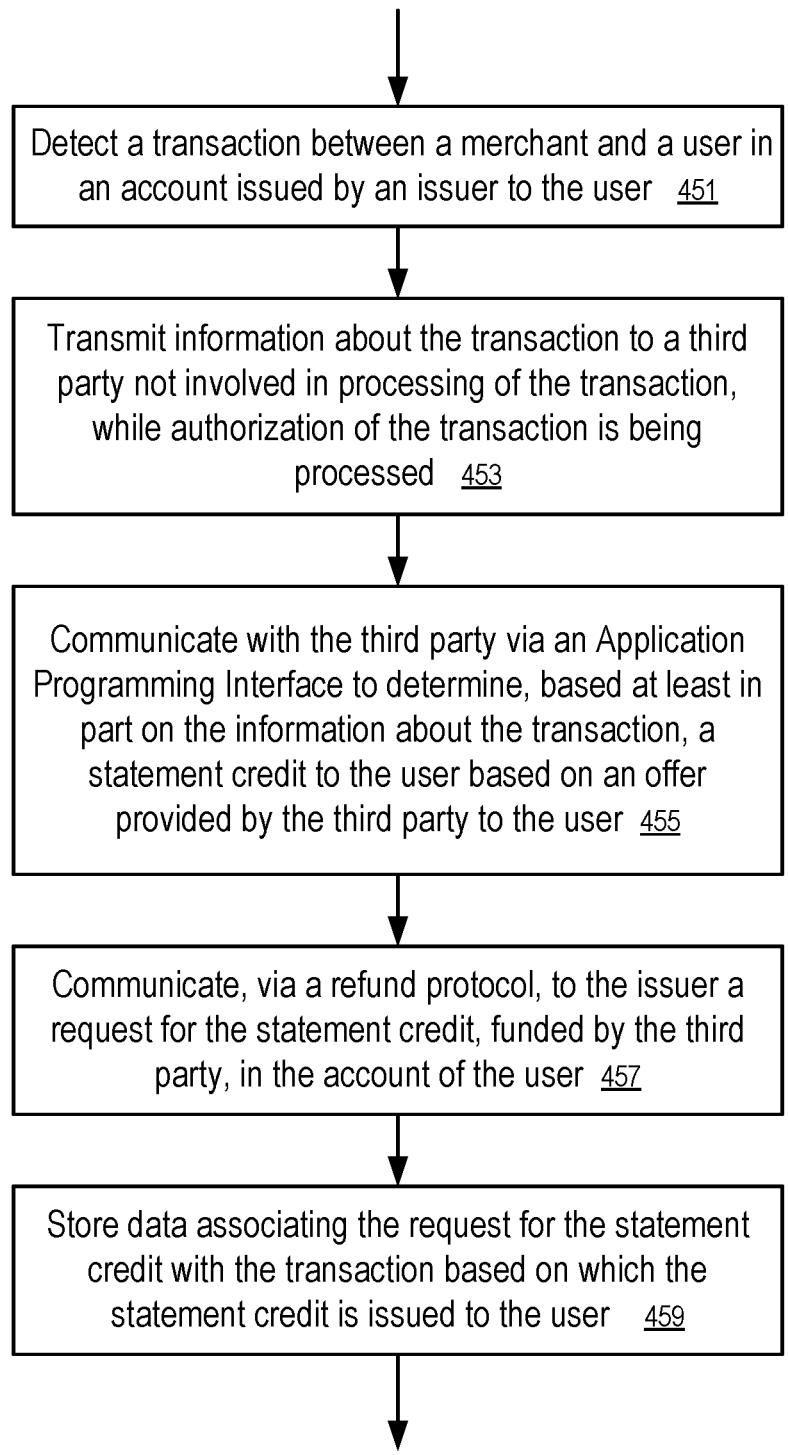
FIG. 17 shows a method to provide third party statement credits according to one embodiment.

FIG. 17 shows a method to provide third party statement credits according to one embodiment. For example, the method of claim 17 can be implemented in the system of FIG. 16.

In FIG. 17, a computing apparatus is configured to: detect (451) a transaction between a merchant (102) and a user (101) in an account (146) issued by an issuer to the user (101); transmit (453) information about the transaction (e.g., notification (250)) to a third party (e.g., benefit qualifier (261)) not involved in processing of the transaction, while authorization of the transaction is being processed (e.g., in the time period between the authorization request (168) and the authorization response (138)); communicate (455) with the third party via an Application Programming Interface (API) to determine, based at least in part on the information about the transaction, a statement credit (e.g., identified in the credit request (407)) to the user (101) based on an offer provided by the third party to the user (101); confirm the validity and permissibility of the credit request (407) based on a pre-defined set of business rules; communicate (457), via a refund protocol, to the issuer a request for the statement credit (e.g., credit (443)), funded by the third party, in the account (146) of the user (101); and store (459) data associating the request for the statement credit (443) with the transaction based on which the statement credit is issued to the user (101).

For example, in FIG. 16, the data warehouse (149) stores the credit record (403) to record the credit (443), and the transaction data (109) to record the payment transaction between the consumer account (146) and the merchant account (148) as authorized by the authorization response (138), and data associating the credit record (403) and the transaction data (109) to indicate that the credit (443) is a benefit for the transaction authorized by the authorization response (138).

In one embodiment, after the user (101) enrolls an eligible consumer account (146) through the benefit qualifier (261) (e.g., via a web site or mobile app) and provides consent to applicable terms and conditions, the transaction handler (103) is authorized to provide the real-time notification (250) of the relevant transactions to the benefit provider (261).

The benefit provider (261) may optionally deliver real-time notifications to the point of interaction (107) of the user (101), when the user (101) completes a qualifying payment transaction for a qualifying purchase, and/or when the credit (443) is communicated by transaction handler (103). The credits (e.g., 443) are typically posted to the consumer account (146) within a predetermined period of time (e.g., 3-5 days).

The statement of the consumer account (146) can be configured to display a detailed description for the issued credit (433), including the name of the benefit qualifier (261) and the merchant (102) (e.g., in the form of "[Benefit Qualifier Name] Offers [Merchant Name]"), along with the customer service phone number of the benefit qualifier (261). In one embodiment, the description is generated based on, or provided by, the return clearing transaction message for the credit (443). The description avoids customer confusion regarding the identities of the third party benefit qualifier and the participating merchant, and what phone number to call for service issues. The details provided in the description also address issuer concerns regarding data quality and customer service.

In one embodiment, the merchant (102) contracts with the benefit qualifier (261) to advertise offers on the platform of the benefit qualifier (261). The merchant (102) and the benefit qualifier (261) will work together to design and publish offers.

Since the offers are redeemed automatically when the user (101) uses an enrolled consumer account (146) to make the payment for a qualifying purchase, no additional action, equipment or software is required by the merchant at the point of sale.

Since qualifying purchases can be processed normally without any modifications at the transaction terminal (105) and the acquirer processor (147), there is no merchant or acquirer impact on the transaction processing to provide the benefit via the system as illustrated in FIG. 16.

The benefit qualifier (261) interested in using the mechanism to provide the benefit in the form of credits (e.g., 443) may identify or establish a sponsor account (431) with the sponsor processor (433), or the transaction handler (103), for posting statement credits.

The benefit qualifier (261) may recruit merchants, negotiating offer terms with each merchant (e.g., 102), publishing merchant offers and enrolling users (e.g., 101).

In one embodiment, offers are configured on an offer platform (e.g., stored in data warehouse (149)), with rules for identifying a qualifying transaction (e.g. merchant, date range, minimum purchase amount). Some of the rules or conditions are used to formulate the trigger records (207).

The transaction handler (103) is configured to identify qualifying transactions that meet offer terms and deliver a real-time notification (250) to the benefit qualifier (261) via an application programming interface (API).

In one embodiment, once a qualifying transaction settles, the statement credit amount is calculated by the benefit qualifier (261) or the portal (143), based on pre-defined offer rules.

For examples, the benefit of the offers can be calculated as either a percentage of the total transaction amount, with a limit on the maximum discount amount (e.g. "Receive 10% off your purchase, up to $15"), or a fixed amount (e.g. "Spend $20 or more and receive a $5 statement credit").

In one embodiment, a computing apparatus includes the transaction handler (103) and the portal (143) illustrated in FIG. 16, each of which can be implemented via one or more data processing systems illustrated in FIG. 7 with more or less components.

In one embodiment, the transaction handler (103) has at least a first network interface configured to interface with an electronic payment processing system illustrated in FIG. 4; and the portal (143) has at least a second network interface configured to provide a web-based application programming interface. The computing apparatus includes at least one microprocessor (173) and a memory (e.g., 167) storing instructions configured to instruct the at least one microprocessor (173) to perform various operations.

For example, the transaction handler (103) is configured to detect, via the first network interface, a payment transaction between: a merchant account (148) controlled by an acquirer processor (147) on behalf of a merchant (102), and a payment account (146) controlled by an issuer processor (145) on behalf of a user (101).

For example, the transaction handler (103) can be configured to detect the authorization of the payment transaction for the authorization of a third party statement credit and to detect the settlement of the payment transaction for the settlement of the third party statement credit.

In one embodiment, in response to the detection of the payment transaction, the portal (143) transmits, via the second network interface, information about the payment transaction (405) to a third party (e.g., benefit qualifier (261)) who is not involved in the processing of the payment transaction. The notification (250) containing the transaction information (405) is transmitted to the benefit qualifier (261) during processing of the payment transaction in the electronic payment processing system (e.g., during the authorization and/or settlement of the payment transaction). The portal (143) communicates, via the second network interface, with the third party (e.g., the benefit qualifier (261)) via an application programming interface to determine a statement credit to the user (101) based on an offer provided by the third party to the user (101). In one embodiment, the provisioning of the statement credit is based at least in part on the transaction information (405) provided via the notification (250).

In response to a request received via the application programming interface from the third party to provide the statement credit, the transaction handler (103) is configured to generate a statement credit request and communicate, via the first network interface, the statement credit request to the issuer processor (145) of the payment account (146) using a refund protocol for a refund from a sponsor (431) account to the payment account (146) of the user (101). The sponsor account (431) is different from the merchant account (148)

In one embodiment, the sponsor account (431) is controlled by the transaction handler (103) on behalf of a sponsor of the offer.

In response to the detection of the payment transaction by the transaction handler (103), the computing apparatus is configured to determine whether a budget (441) of the sponsor account (431) has been depleted. The credit request (407) is accepted and the credit (443) via refund protocol is communicated to the issuer processor (145) of the consumer payment account (146) of the user (101), after a determination is made that the statement credit is allowable by the budget (441) of the sponsor account (441).

In one embodiment, the computing apparatus is configured to track, availability of funds in the sponsor account (431) for the statement credit, and determine whether to accept or decline the credit request (407) received via the application programming interface from the third party benefit qualifier (261) based on the availability of the funds in the sponsor account (431).

In one embodiment, the computing apparatus is configured to check validity and permissibility of the credit request (407) based on a set of pre-defined rules of the offer. The credit (443) is communicated to the issuer processor (443) of the consumer payment account (146) via the refund protocol after a determination is made that the credit request (407) for the credit amount (409) is valid and permissible in accordance with the rules.

In one embodiment, the transaction handler (103) is configured to store in the data warehouse (149) data associating the statement credit identified by the credit record (403) with the payment transaction identified by the transaction data (109) to maintain the transaction integrity of the credit (443) that is dependent upon the payment transaction, where the payment transaction is processed between the merchant account (148) controlled by the acquirer processor (147) and the consumer payment account (146) controlled by the issuer processor (145) independent of the statement credit. The transaction handler (103) is configured to initiate a change to the statement credit in response to a change to the payment transaction. For example, if the merchant (102) initiates a refund against the payment transaction, the transaction handler (103) is configured to initiate a return of the credit (443) back to the sponsor account (431).

In one embodiment, the credit (443) initiated by transaction handler (103) in the electronic payment processing system is neutral in interchange fees for the processing of the payment transaction in the electronic payment processing system. Thus, although the credit (443) is implemented via a refund protocol, the credit (443) is implemented as a transaction separate from the payment transaction between the merchant account (148) and the consumer account (146); and as a result, the credit (443) has no impact on interchange fees for the processing of the payment transaction. The interchange fees for the processing of the payment transaction are the same with or without the credit (443).

In one embodiment, the statement credit request identifies both the merchant (102) and the third party benefit qualifier (261) as responsible parties for the refund. Thus, the user (101) can be adequately informed of the reason for the refund on the monthly statement of the consumer payment account (146).

In one embodiment, the sponsor account (431) is controlled, on behalf of a sponsor of the offer, by a sponsor processor (431) connected in the electronic payment processing system. The sponsor processor (433) may be implemented within a transaction handler of the electronic payment processing system.

In one embodiment, the transaction handler (103) is configured to communicate with the sponsor processor (433) for authorization of the credit (443), during the authorization processing of the payment transaction. The credit (443) is communicated to the issuer processor (145) of the payment account (146) after an authorization response (427) from the sponsor processor (431) approves the statement credit as a benefit of the offer. In one embodiment, a budget (441) associated with the offer is controlled/enforced by the sponsor processor (431)

In one embodiment, the data warehouse (149) is configured to store data identifying the enrolled merchants (102) and the enrolled users (e.g., 101). The payment transaction is detected based on monitoring authorization requests of payment transactions between the merchant and the user.

In one embodiment, the transaction information (405) provided in the notification (250) users identifiers of the user (101) and the merchant (102) (e.g., IDs assigned by the benefit qualifier (261)) without revealing account information of the merchant account (148) and the consumer payment account (146).

In one embodiment, the credit (443) is communicated to the issuer processor (145) of the payment account using the refund protocol in response to settlement of the payment transaction.

The computing apparatus in FIG. 16 and/or configured to implement the method of FIG. 17 can be further implemented, optionally, to perform other operations discussed below, such as the operations discussed in the section entitled "TRANSACTION DATA BASED SERVICES."

Some of the hardware arrangements are discussed in the sections entitled "CENTRALIZED DATA WAREHOUSE" and "HARDWARE."

For example, the transaction handler (103) discussed above can be further used to record transaction data (109) to provide transaction data based services as illustrated in FIG. 1 and discussed in the section entitled "TRANSACTION DATA BASED SERVICES."

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. Pat. App. Pub. No. 2010/0174623, entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In FIG. 2, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

A "card-present" transaction typically involves physically presenting the account identification device (141), such as a financial transaction card, to the merchant (e.g., via swiping a credit card at a POS terminal of a merchant); and a "card-not-present" transaction typically involves presenting the account information (142) of the consumer account (146) to the merchant to identify the consumer account (146) without physically presenting the account identification device (141) to the merchant or the transaction terminal (105).

The transaction records (301) of one embodiment may further include details about the products and/or services involved in the purchase.

When there is voluminous data representing the transaction records (301), the spending patterns reflected in the transaction records (301) can be difficult to recognize by an ordinary person.

In FIG. 2, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

Examples of the spending frequency variables (313) and spending amount variables (315) defined for various merchant categories (e.g., 306) in one embodiment are provided in U.S. Pat. App. Pub. No. 2010/0306029, entitled "Cardholder Clusters," and in U.S. Pat. App. Pub. No. 2010/0306032, entitled "Systems and Methods to Summarize Transaction Data," the disclosures of which applications are hereby incorporated herein by reference.

In FIG. 2, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

The transaction records (301) can be aggregated according to a buying entity, or a selling entity. For example, the aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular merchant having transactions with multiple accounts can be aggregated for a merchant level analysis. For example, the transaction records (301) for a particular merchant group can be aggregated for a merchant group level analysis. The aggregation (317) can be formed separately for different types of transactions, such as transactions made online, offline, via phone, and/or "card-present" transactions vs. "card-not-present" transactions, which can be used to identify the spending pattern differences among different types of transactions.

In FIG. 2, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

In FIG. 2, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In FIG. 2, a factor analysis (327) is performed to reduce the redundancy and/or correlation among the variables (e.g., 313, 315). The factor analysis (327) identifies the definitions (331) for factors, each of which represents a combination of the variables (e.g., 313, 315). A factor from the factor analysis (327) is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In general, an aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353); recurrent/installment transactions are combined (355); and account data are selected (357) according to a set of criteria related to activity, consistency, diversity, etc.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109).

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

Optionally, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Details about aggregated spending profile (341) in one embodiment are provided in U.S. Pat. App. Pub. No. 2010/0306032, entitled "Systems and Methods to Summarize Transaction Data," the disclosure of which is hereby incorporated herein by reference.

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. Pat. App. Pub. No. 2013/0124263, entitled "Systems and Methods to Summarize Transaction data," the disclosure of which is hereby incorporated herein by reference.

Transaction Processing and Data

FIG. 4 shows a system to provide information and/or services based on transaction data (109) according to one embodiment.

In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile (341), offer redemption notification, etc. The portal (143) may be implemented as a web portal, a telephone gateway, a file/data server, etc.

In FIG. 4, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 4, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 4, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 4, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. Pat. App. Pub. No. 2007/0055597, entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, entitled "Merchant Benchmarking Tool," the disclosures of which applications are hereby incorporated herein by reference.

Transaction Terminal

FIG. 5 illustrates a transaction terminal according to one embodiment. The transaction terminal (105) illustrated in FIG. 5 can be used in various systems discussed in connection with other figures of the present disclosure. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 7. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method in an electronic payment processing system, the method comprising:
   detecting, by a computing device configured in the electronic payment processing system, a payment transaction between:
      a merchant account controlled by an acquirer processor on behalf of a merchant, and
      a payment account controlled by an issuer processor on behalf of a user, wherein the computing device includes a transaction handler of the electronic payment processing system coupled between the issuer processor and the acquirer processor, and detects the payment transaction in response to an authorization request transmitted in the electronic payment processing system from a merchant transaction terminal to the issuer processor via the transaction handler;
   determining, by the transaction handler during processing of the authorization request from the merchant transaction terminal, that the payment transaction is of interest to a third party benefit qualifier that is not involved in processing of the payment transaction, the determination based at least partially on trigger records stored in a data warehouse of the computing device that is coupled to the transaction handler, the trigger records generated in response to input by the third party benefit qualifier;
   transmitting, by at least one of a message broker and an application programming interface of the computing device configured in the electronic payment processing system, a notification containing transaction information about the payment transaction to the third party benefit qualifier during processing of the payment transaction in the electronic payment processing system, wherein the notification causes the third party benefit qualifier to:
      determine a statement credit to the payment account of the user based on an offer provided to the user; and
      transmit, using the application programming interface of a portal of the computing device, a request to provide the statement credit to the payment account;
   receiving, by the computing device, the request via the application programming interface from the third party benefit qualifier to provide the statement credit to the payment account;
   in response to receiving the request, generating, by the computing device, a statement credit request; and
   communicating, by the transaction handler of the computing device in the electronic payment processing system, the statement credit request to the issuer processor of the payment account using a refund protocol in the electronic payment processing system to provide a refund from a third account to the payment account, wherein the third account is different from the merchant account.

2. The method of claim 1, wherein the computing device is integrated with the transaction handler of the electronic payment processing system.

3. The method of claim 2, wherein the statement credit request communicated to the issuer processor using the refund protocol comprises a return clearing transaction message.

4. The method of claim 3, wherein the third account is controlled by the transaction handler on behalf of a sponsor of the offer.

5. The method of claim 4, further comprising:
   determining, by the computing device, whether a budget of the third account has been depleted;
   wherein the statement credit request is communicated to the issuer processor of the payment account after a determination that the statement credit to the payment account is allowed by the budget of the third account.

6. The method of claim 4, further comprising:
   tracking, by the computing device, availability of funds in the third account for the statement credit to the payment account; and
   determining, by the computing device, whether to accept or decline the request received via the application programming interface from the third party benefit qualifier based on the availability of the funds in the third account.

7. The method of claim 4, further comprising:
   confirming, by the computing device, validity and permissibility of the statement credit to the payment account based on a set of pre-defined rules of the offer;
   wherein the statement credit request is communicated to the issuer processor of the payment account after a determination that the statement credit to the payment account is valid and permissible in accordance with the set of pre-defined rules.

8. The method of claim 4, further comprising:
storing, by the computing device, data associating the statement credit to the payment account with the payment transaction; and
initiating, by the computing device, a change to the statement credit to the payment account in response to a change to the payment transaction;
wherein the payment transaction is processed, independent of the statement credit to the payment account, between the merchant account controlled by the acquirer processor and the payment account controlled by the issuer processor.

9. The method of claim 4, wherein the statement credit to the payment account is neutral in interchange fees for the processing of the payment transaction in the electronic payment processing system.

10. The method of claim 1, wherein the statement credit request identifies both the merchant and the third party benefit qualifier as responsible parties for the refund.

11. The method of claim 1, wherein the third account is a sponsor account controlled, on behalf of a sponsor of the offer, by a sponsor processor connected in the electronic payment processing system.

12. The method of claim 11, wherein the sponsor processor is implemented within the transaction handler of the electronic payment processing system having acquirer processors and issuer processors interconnected by the transaction handler.

13. The method of claim 11, further comprising:
communicating, by the computing device, with the sponsor processor for authorization of the statement credit to the payment account during authorization of the payment transaction;
wherein the statement credit request is communicated to the issuer processor of the payment account after an authorization response from the sponsor processor approving the statement credit to the payment account as a benefit of the offer.

14. The method of claim 13, wherein a budget associated with the offer is controlled by the sponsor processor.

15. The method of claim 13, wherein the statement credit to the payment account is settled with the issuer processor after settlement of the payment transaction.

16. The method of claim 1, further comprising:
storing, in the computing device, data identifying the merchant and the user;
wherein the payment transaction is detected based on monitoring authorization requests of payment transactions between the merchant and the user.

17. The method of claim 16, wherein the transaction information about the payment transaction transmitted to the third party benefit qualifier includes identifiers of the user and the merchant without revealing account information of the merchant account of the merchant and the payment account of the user.

18. The method of claim 1, wherein the statement credit request is communicated to the issuer processor of the payment account using the refund protocol in response to settlement of the payment transaction.

19. A non-transitory computer storage media storing instructions configured to instruct a computing device configured in an electronic payment processing system to perform a method, the method comprising:

detecting, by the computing device configured in the electronic payment processing system, a payment transaction between:
a merchant account controlled by an acquirer processor on behalf of a merchant, and
a payment account controlled by an issuer processor on behalf of a user, wherein the computing device includes a transaction handler of the electronic payment processing system coupled between the issuer processor and the acquirer processor, and detects the payment transaction in response to an authorization request transmitted in the electronic payment processing system from a merchant transaction terminal to the issuer processor via the transaction handler;
determining, by the transaction handler during processing of the authorization request from the merchant transaction terminal, that the payment transaction is of interest to a third party benefit qualifier that is not involved in processing of the payment transaction, the determination based at least partially on trigger records stored in a data warehouse of the computing device that is coupled to the transaction handler, the trigger records generated in response to input by the third party benefit qualifier;
transmitting, by at least one of a message broker and an application programming interface of the computing device configured in the electronic payment processing system, a notification containing transaction information about the payment transaction to the third party benefit qualifier, during processing of the payment transaction in the electronic payment processing system, wherein the notification causes the third party benefit qualifier to:
determine a statement credit to the payment account of the user based on an offer provided to the user; and
transmitting, using the application programming interface of a portal of the computing device, a request to provide the statement credit to the payment account;
receiving, by the computing device, the request via the application programming interface from the third party benefit qualifier to provide the statement credit to the payment account;
in response to receiving the request, generating, by the computing device, a statement credit request; and
communicating, by the transaction handler of the computing device in the electronic payment processing system, the statement credit request to the issuer processor of the payment account using a refund protocol in the electronic payment processing system to provide a refund from a third account to the payment account, wherein the third account is different from the merchant account.

20. A computing apparatus, comprising:
a data warehouse;
a first network interface configured to interface with an electronic payment processing system;
a transaction handler coupled to the electronic payment processing system via the first network interface and coupled between an issuer processor and an acquirer processor, and further coupled to the data warehouse;
a second network interface configured to provide a web-based application programming interface;
a portal coupled to the second network interface to provide the web-based application programming interface;
at least one microprocessor; and a memory storing instructions configured to instruct the at least one microprocessor to at least:
    detect, via the first network interface,
        a payment transaction between a merchant account controlled by the acquirer processor on behalf of a merchant, and
        a payment account controlled by the issuer processor on behalf of a user, wherein the payment transaction is detected in response to an authorization request transmitted in the electronic payment processing system from a merchant transaction terminal to the issuer processor via the transaction handler;
    determine, via the transaction handler during processing of the authorization request from the merchant transaction terminal, that the payment transaction is of interest to a third party benefit qualifier that is not involved in processing of the payment transaction, the determination based at least partially on trigger records stored in the data warehouse, the trigger records generated in response to input by the third party benefit qualifier;
    transmit, via the second network interface, a notification containing transaction information about the payment transaction to the third party benefit qualifier during processing of the payment transaction in the electronic payment processing system, wherein the notification causes the third party benefit qualifier to:
        determine a statement credit to the payment account of the user based on an offer provided to the user; and
        transmit, using the web-based application programming interface of the portal, a request to provide the statement credit to the payment account;
    receive the request via the web-based application programming interface of the portal from the third party benefit qualifier to provide the statement credit to the payment account;
    in response to receiving the request, generate a statement credit request; and
    communicate, via the first network interface, the statement credit request to the issuer processor of the payment account using a refund protocol in the electronic payment processing system to provide a refund from a third account to the payment account, wherein the third account is different from the merchant account.

\* \* \* \* \*